US008194175B2

(12) United States Patent
Kimoto

(10) Patent No.: US 8,194,175 B2
(45) Date of Patent: Jun. 5, 2012

(54) IMAGE PICKUP APPARATUS FOCUSING ON AN OBJECT TO BE FOCUSED IN CONTINUOUS SHOOTING MODE

(75) Inventor: Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 11/869,623

(22) Filed: Oct. 9, 2007

(65) Prior Publication Data

US 2008/0143865 A1 Jun. 19, 2008

(30) Foreign Application Priority Data

Dec. 15, 2006 (JP) ................................ 2006-338232

(51) Int. Cl.
*G03B 13/00* (2006.01)
*H04N 5/232* (2006.01)

(52) U.S. Cl. ...................................................... 348/353

(58) Field of Classification Search .................. 348/346, 348/347, 348, 350, 352, 353, 354, 355, 356
See application file for complete search history.

(56) References Cited

U.S. PATENT DOCUMENTS

| | | | | |
|---|---|---|---|---|
| 2004/0057712 | A1* | 3/2004 | Sato et al. | 396/89 |
| 2005/0104993 | A1* | 5/2005 | Matsumoto | 348/345 |
| 2005/0174451 | A1* | 8/2005 | Nozaki et al. | 348/240.99 |
| 2005/0248681 | A1* | 11/2005 | Nozaki et al. | 348/345 |
| 2007/0064145 | A1* | 3/2007 | Sugimoto | 348/345 |
| 2007/0065044 | A1* | 3/2007 | Park et al. | 382/305 |
| 2008/0131109 | A1* | 6/2008 | Honjo et al. | 396/123 |

FOREIGN PATENT DOCUMENTS

| | | | |
|---|---|---|---|
| JP | 63-098285 | A | 4/1988 |
| JP | 2004-317699 | A | 11/2004 |
| JP | 2005-223660 | A | 8/2005 |
| JP | 2005-223660 | A | 8/2005 |

* cited by examiner

*Primary Examiner* — Albert Cutler
(74) *Attorney, Agent, or Firm* — Canon U.S.A., Inc. IP Division

(57) ABSTRACT

An image pickup apparatus includes an extraction unit configured to extract feature points of an object from picked-up image data, a focus adjustment unit configured to, before starting pickup of an image for recording and/or storage, detect an in-focus position by moving a focus lens in a direction of an optical axis over a scan region which is decided based on the extracted feature points, and to control movement of the focus lens to be matched with the in-focus position, and an operation timing control unit configured to operate the focus adjustment unit and the extraction unit in a synchronous relation (inter-shooting AF(1) and AF(2)) in a continuous shooting mode in which the pickup of an image for recording and/or storage is repeated plural times.

4 Claims, 18 Drawing Sheets

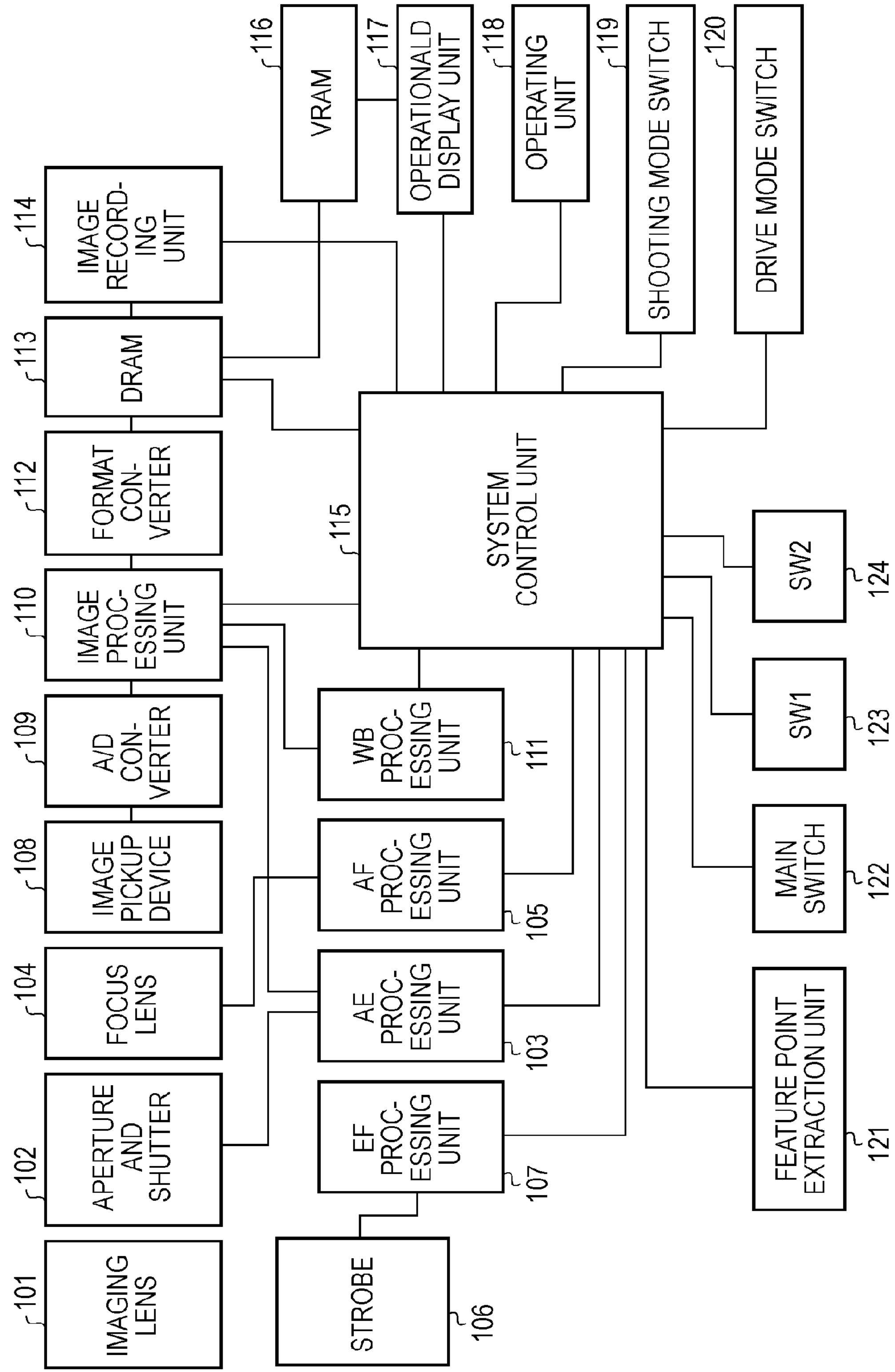
FIG. 1
IMAGING LENS
101
APERTURE AND SHUTTER
102
FOCUS LENS
104
IMAGE PICKUP DEVICE
108
A/D CON-VERTER
109
IMAGE PROC-ESSING UNIT
110
FORMAT CON-VERTER
112
DRAM
113
IMAGE RECORD-ING UNIT
114
STROBE
106
EF PROC-ESSING UNIT
107
AE PROC-ESSING UNIT
103
AF PROC-ESSING UNIT
105
WB PROC-ESSING UNIT
111
SYSTEM CONTROL UNIT
115
VRAM
116
OPERATIONALD DISPLAY UNIT
117
OPERATING UNIT
118
SHOOTING MODE SWITCH
119
DRIVE MODE SWITCH
120
FEATURE POINT EXTRACTION UNIT
121
MAIN SWITCH
122
SW1
123
SW2
124

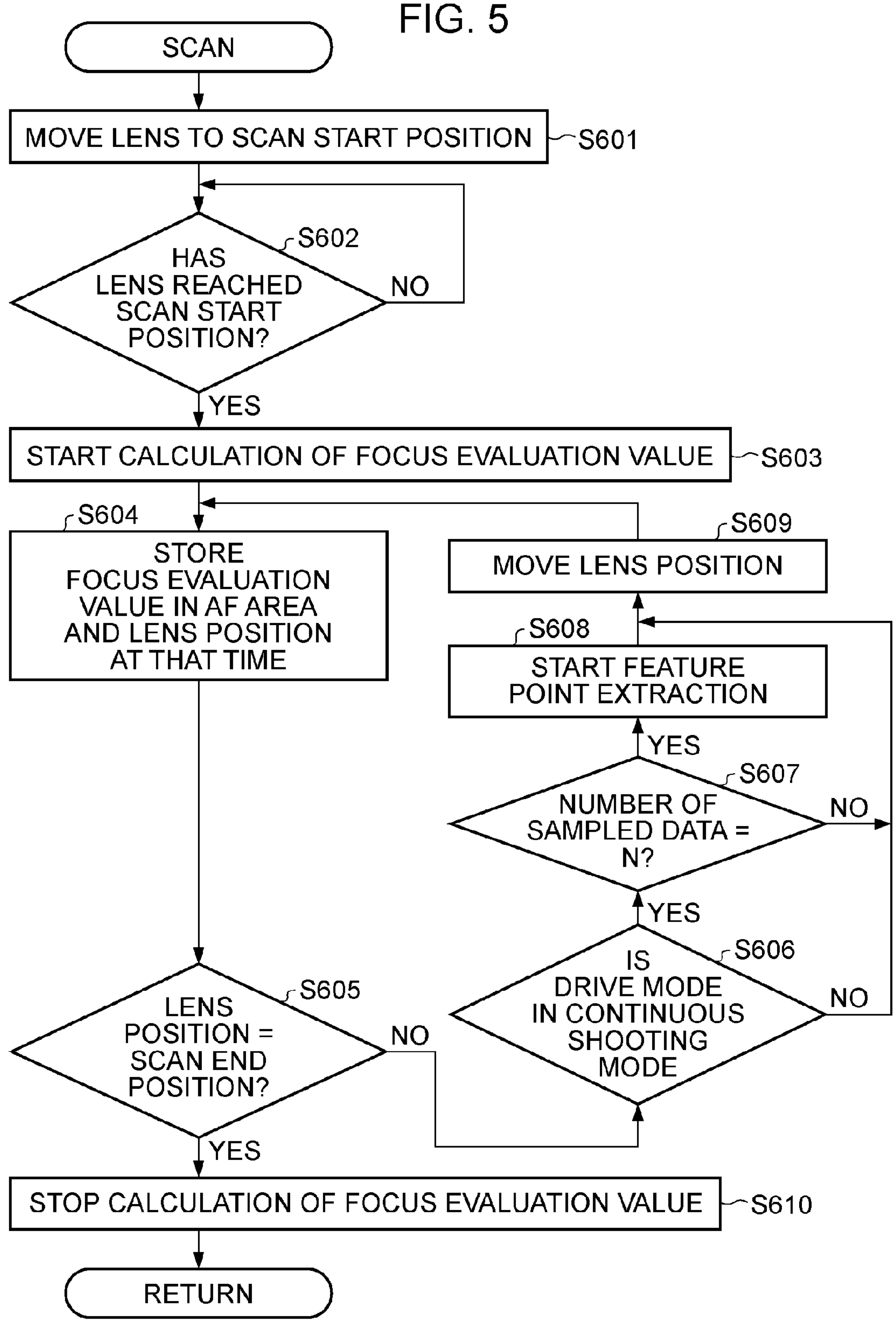
FIG. 5
SCAN
MOVE LENS TO SCAN START POSITION
S601
HAS LENS REACHED SCAN START POSITION?
S602
NO
YES
START CALCULATION OF FOCUS EVALUATION VALUE
S603
STORE FOCUS EVALUATION VALUE IN AF AREA AND LENS POSITION AT THAT TIME
S604
MOVE LENS POSITION
S609
START FEATURE POINT EXTRACTION
S608
YES
NUMBER OF SAMPLED DATA = N?
S607
NO
YES
IS DRIVE MODE IN CONTINUOUS SHOOTING MODE
S606
NO
LENS POSITION = SCAN END POSITION?
S605
NO
YES
STOP CALCULATION OF FOCUS EVALUATION VALUE
S610
RETURN FOCUS EVALUATION VALUE
FOCUS LENS POSITION
SL = SL1+SL2
SL1
SL2
L
≧SlopeThr
A
B
C
D
E FOCUS LENS POSITION
FAR
SAME POSITION AS CURRENT POSITION - (2)
PRIMARY APPROXIMATION - (3)
FP1
FP2
SCAN RANGE
FP3
SECONDARY APPROXIMATION - (4)
FP4
MOVEMENT OF OBJECT
FIRST FRAME
SECOND FRAME
THIRD FRAME
FOURTH FRAME
TIME
NUMBER OF FRAMES OF CONTINUOUS SHOOTING

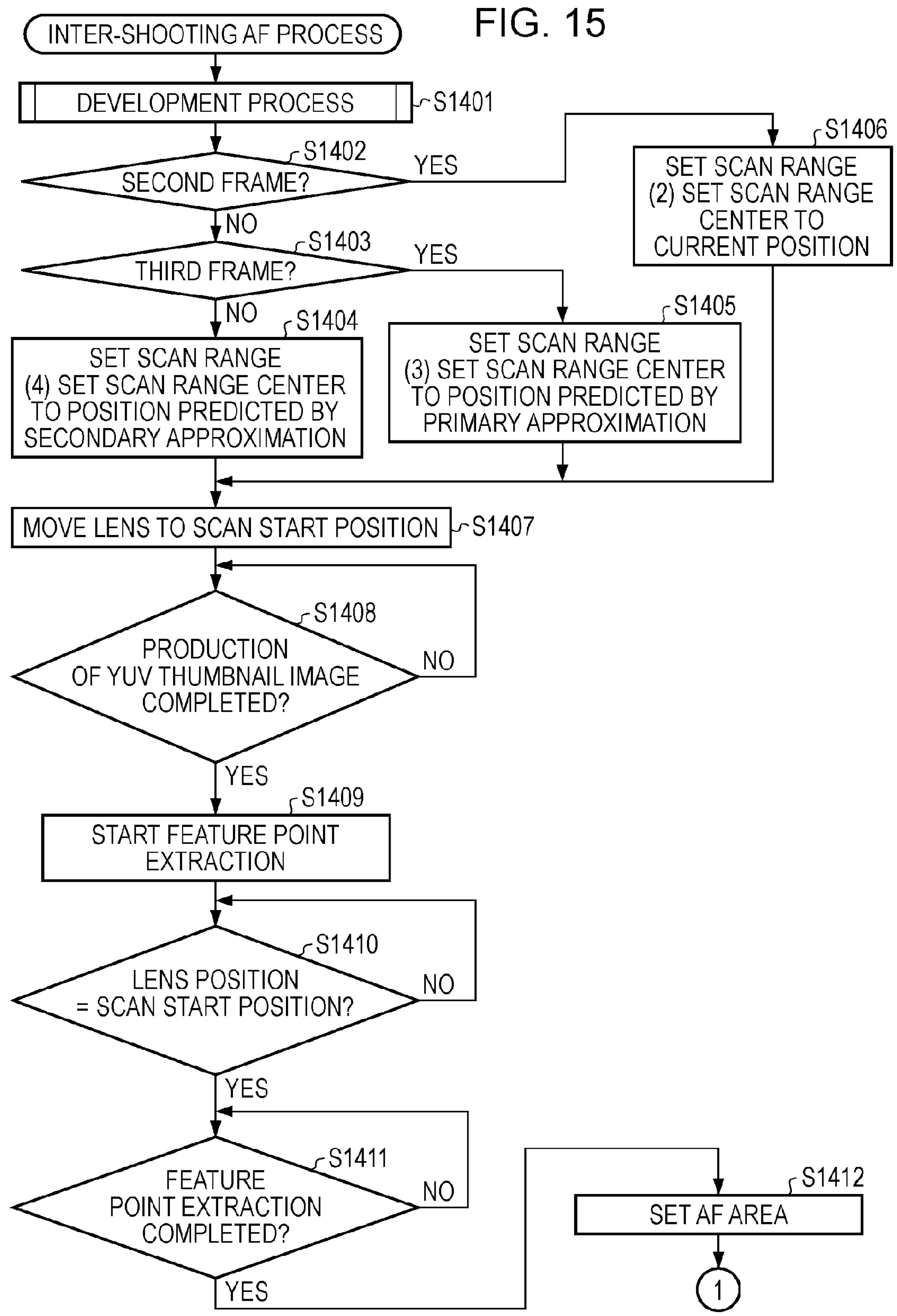
FIG. 15
INTER-SHOOTING AF PROCESS
DEVELOPMENT PROCESS
S1401
SECOND FRAME?
S1402
YES
NO
THIRD FRAME?
S1403
YES
NO
S1406
SET SCAN RANGE (2) SET SCAN RANGE CENTER TO CURRENT POSITION
S1405
SET SCAN RANGE (3) SET SCAN RANGE CENTER TO POSITION PREDICTED BY PRIMARY APPROXIMATION
S1404
SET SCAN RANGE (4) SET SCAN RANGE CENTER TO POSITION PREDICTED BY SECONDARY APPROXIMATION
MOVE LENS TO SCAN START POSITION
S1407
PRODUCTION OF YUV THUMBNAIL IMAGE COMPLETED?
S1408
NO
YES
START FEATURE POINT EXTRACTION
S1409
LENS POSITION = SCAN START POSITION?
S1410
NO
YES
FEATURE POINT EXTRACTION COMPLETED?
S1411
NO
YES
SET AF AREA
S1412
1

IMAGE PICKUP APPARATUS FOCUSING ON AN OBJECT TO BE FOCUSED IN CONTINUOUS SHOOTING MODE

BACKGROUND OF THE INVENTION

1. Field of the Invention

The present invention relates to a focus adjusting technique.

2. Description of the Related Art

Hitherto, there is an image pickup apparatus in which feature points representing, e.g., an eye, a nose and a mouth of a human object, are extracted and an AF (autofocusing) area is set by using the extracted feature points. For example, Japanese Patent Laid-Open No. 2004-317699 proposes an image pickup apparatus which can determine a size represented by extracted feature points and set an optimum AF area in accordance with the determined result, and which can calculate the distance up to an object based on the extracted feature points.

However, extracting the feature points of the human object is a time consuming process. In a particular situation specific to a camera, e.g., in continuous shooting, therefore, camera performance deteriorates in some cases as a result of executing the feature point extraction process. To avoid such a deterioration of the camera performance, Japanese Patent Laid-Open No. 2005-223660 proposes a control technique of not executing the feature point extraction process when a continuous shooting mode, i.e., a mode of picking up an object image in a successive manner, is set. Alternatively, in the continuous shooting mode, an area used for detecting the feature points is set to a smaller size than that in a different mode from the continuous shooting mode. That setting reduces a time required for the feature point extraction process.

With the control technique of not executing the feature point extraction process in the continuous shooting mode, however, it is difficult for a camera to recognize a situation of movement of the object during a period of the continuous shooting. Particularly, when the camera includes a system of performing focus adjustment of the contrast detection type in the continuous shooting mode, a focusing operation following to the object cannot be continued any more if the object has moved outside an AF area set for calculating a focus evaluation value (i.e., a focus signal corresponding to image contrast).

Further, with the known technique of performing control to reduce the feature point detection area in order to cut the time required for the feature point extraction process, the following problem occurs. In a situation where the object has moved outside the feature point detection area, the AF area cannot be secured in a following relation to the object. Consequently, the focusing operation following to the object cannot be continued any more.

SUMMARY OF THE INVENTION

The present invention has been made in consideration of the above-described state of the art and provides an image pickup apparatus capable of controlling a focus so as to follow an object even in a continuous shooting mode.

According to the present invention, an image pickup apparatus includes an extraction unit configured to extract feature points of an object from picked-up image data, a focus adjustment unit configured to, before starting pickup of an image for recording and/or storage, detect an in-focus position by moving a focus lens in a direction of an optical axis over a scan region which is decided based on the extracted feature points, and to control movement of the focus lens to be matched with the in-focus position, and an operation timing control unit configured to operate the focus adjustment unit and the extraction unit in a synchronous relation in a continuous shooting mode in which the pickup of an image for recording and/or storage is repeated plural times. The operation timing control unit operates the focus adjustment unit and the extraction unit in an asynchronous relation in a mode other than the continuous shooting mode.

Further features and aspects of the present invention will become apparent from the following description of exemplary embodiments with reference to the attached drawings.

BRIEF DESCRIPTION OF THE DRAWINGS

FIG. 1 is a block diagram showing of a circuit configuration of an image pickup apparatus according to first and second exemplary embodiments of the present invention.

FIG. 5 is a flowchart of a scan operation subroutine in FIG. 4.

FIG. 15 is a flowchart showing an inter-shooting AF process in the continuous shooting mode in the second exemplary embodiment of the present invention.

DESCRIPTION OF THE EMBODIMENTS

Figure 2:
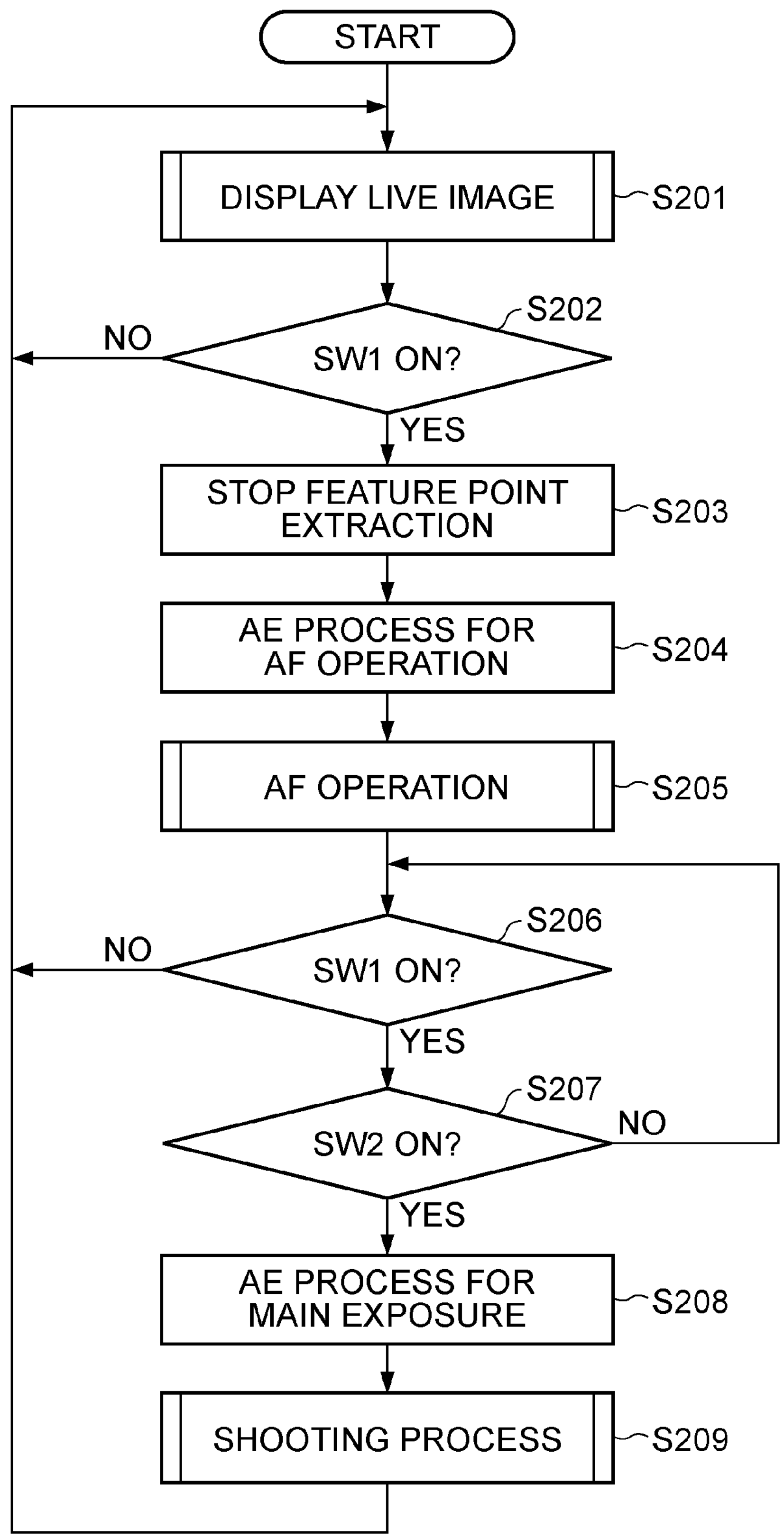
FIG. 2 is a flowchart showing a series of operations executed in the image pickup apparatus according to first and second exemplary embodiments of the present invention.

Various exemplary embodiments, features and aspects of the present invention will now herein be described in detail with reference to the accompanying drawings.

First Exemplary Embodiment

The first exemplary embodiment of the present invention will be described below with reference to the drawings. The first exemplary embodiment is described in connection with a focus adjustment operation in a continuous shooting mode that is executed in a system where a time required for a feature point extraction unit to detect a human face is longer than a time required for a main exposure and a development process. The term "continuous shooting mode" means a mode of repeating pickup of an image plural times at intervals of a certain time for recording and/or storage of the images. Also, the term "continuous shooting" means an operation of repeating pickup of an image for recording and/or storage of the images.

FIG. 1 is a block diagram showing of an example circuit configuration of an image pickup apparatus according to the first exemplary embodiment of the present invention. Referring to FIG. 1, the image pickup apparatus includes an imaging lens 101 provided with a zooming mechanism, an aperture and shutter 102 arranged to control the quantity of light, and an AE (automatic exposure) processing unit 103. Further, the image pickup apparatus includes a focus lens 104 for adjusting a focus to be matched with an image pickup device (described later), an AF (autofocusing) processing unit 105, a strobe 106, and an EF (pre-exposure flash) processing unit 107. Reference numeral 108 denotes the image pickup device which serves as a light receiving unit or a photoelectric conversion unit for converting reflected light from an object to an electric signal. Reference numeral 109 denotes an A/D converter including a CDS (correlated double sampling) circuit which removes noise in an output of the image pickup device 108, and a nonlinear amplification circuit which amplifies an output signal of the image pickup device 108 before A/D conversion. In addition, the image pickup apparatus includes an image processing unit 110 and a WB (white balance) processing unit 111.

The image pickup apparatus further includes a format converter 112, and a high-speed internal memory 113 (e.g., a random access memory or a DRAM). Moreover, the image pickup apparatus includes an image recording unit 114 made up of a recording medium, e.g., a memory card, and an interface for the recording medium, a system control unit 115 configured to execute system control including a shooting sequence, etc., and an image display memory 116 (hereinafter also called a VRAM). Reference numeral 117 denotes an operation-aid display unit configured to display an image, to provide a view for an operation aid and a view indicating a camera state, as well as to display a shooting screen and an AF area (distance measuring area) at the time of shooting. Reference numeral 118 denotes an operating unit for externally operating a camera.

The image pickup apparatus includes a shooting mode switch 119 configured to set one of modes suitable for programmed scenes, landscapes, human figures, sports, etc., and a drive mode switch 120 configured to set a drive mode, such as single shooting, continuous shooting (hereinafter also called successive shootings), and shooting with the use of a self-timer. It further includes a main switch 122 configured to turn on supply of source power to the system, a switch 123 (hereinafter called SW1) configured to perform shooting standby operations (shooting preparatory operations) such as AF and AE operations, and a switch 124 (hereinafter called as SW2) configured to perform shooting after an operation of the switch SW1.

A feature point extraction unit 121 extracts feature points representing, e.g., the shape, the position or the size of the object from among image data and selects, based on the extracted result, an area corresponding to the human face with higher reliability in accordance with a predetermined algorithm. Further, the feature point extraction unit 121 stores, in the DRAM 113, not only feature point information including dimensions (Width and Height) of the selected area and coordinates (x, y) of an upper left corner thereof, but also an extraction process completion flag (TRUE when completed and FALSE when not yet completed) indicating that the feature point extraction process is completed. If the feature point extraction process is completed without detecting the human face, the feature point information including the dimensions and the coordinates are cleared. In other words, Width, Height, x, and y are all reset to 0. The feature point extraction unit 121 is constituted in the form of independent hardware so that the system control unit 115 is able to execute a different process even during the operation of the feature point extraction unit 121.

The DRAM 113 is used as a high-speed buffer for a temporary image storage unit, or as a working memory required in a process of compressing and expanding an image. The operating unit 118 includes, for example, a menu switch configured to perform various kinds of settings, e.g., settings for the shooting function and the image reproducing function of the image pickup apparatus, a zoom lever configured to instruct the zoom operation of the imaging lens, and an operating mode selector switch configured to switch a shooting mode and a reproduction mode from one to the other.

FIG. 2 is a flowchart showing a series of operations executed immediately after power-on in the image pickup apparatus according to the first exemplary embodiment of the present invention. The flowchart is executed by the system control unit 115.

Figure 3:
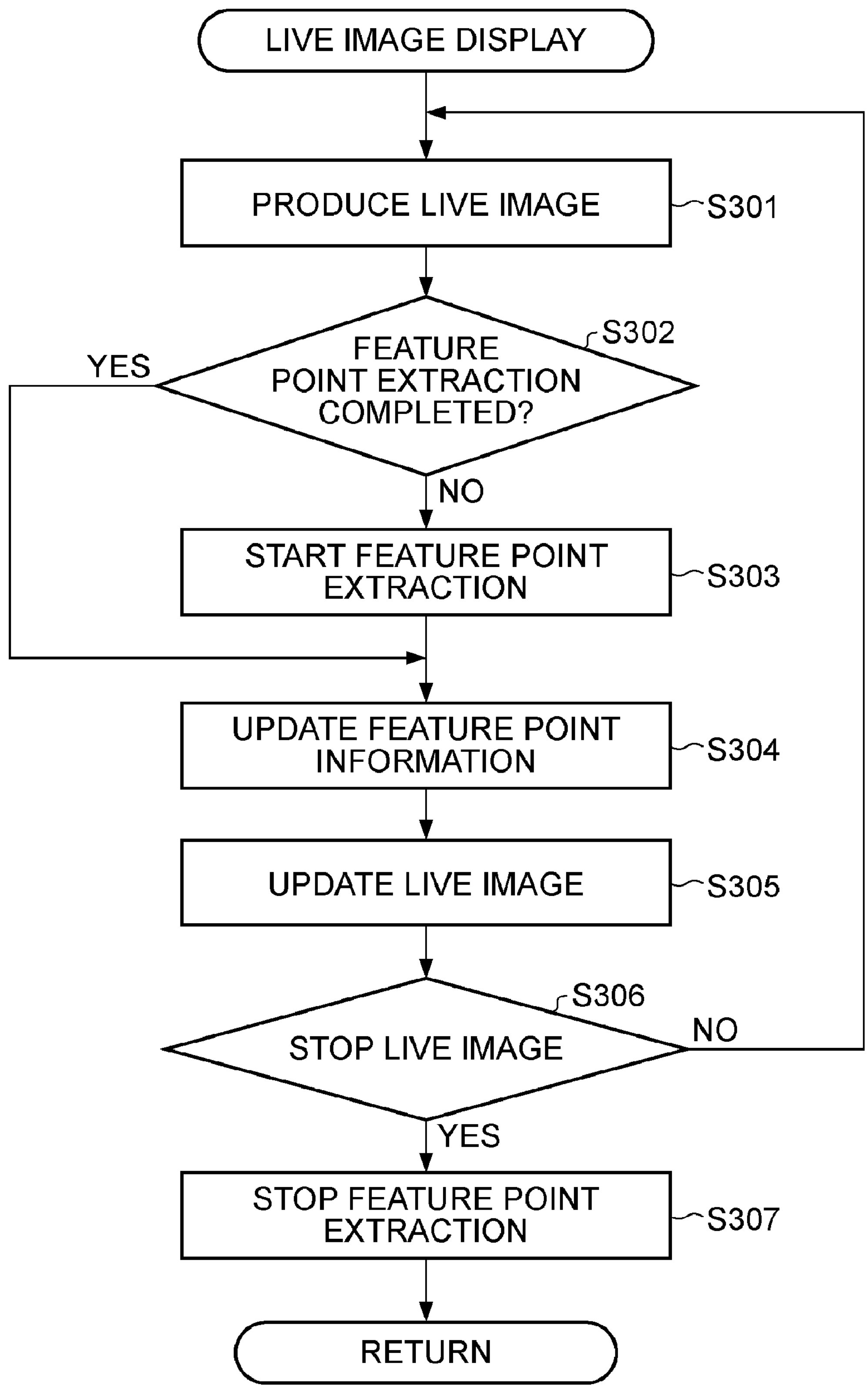
FIG. 3 is a flowchart of a live image display subroutine in FIG. 2.

First, in step S201, a live image is displayed in accordance with a later-described flowchart of FIG. 3. Then, in step S202, the system control unit 115 checks the state of the switch SW1. If the switch SW1 is turned on, the processing advances to step S203. If the switch SW1 is not turned on, the processing is returned to step S201. The switch SW1 has a function of starting the shooting standby operations such as the AF and AE operations.

Next, in step S203, the system control unit 115 stops the feature point extraction process that is executed while the live image is displayed. In step S204, the AE process for the AF operation is executed in the AE processing unit 103 by using an output of the image processing unit 110. In step S205, the AF operation is performed in accordance with a later-described flowchart of FIG. 4. In step S206, the state of the switch SW1 is checked. If the switch SW1 is turned on, the processing advances to step S207. If the switch SW1 is not turned on, the processing is returned to step S201.

If the processing advances to step S207 with the switch SW1 turned on, the state of the switch SW2 is checked in step S207. If the switch SW2 is turned on, the processing advances to step S208. If the switch SW2 is turned off, the processing is returned to step S206 and the focus is locked until the switch SW1 is turned off or until the switch SW2 is turned on. The switch SW2 has a function of starting a shooting process after the operation of the switch SW1.

If the processing advances to step S208 with the switch SW2 turned on, an AE process for the main exposure is executed. In step S209, the shooting process is executed in accordance with a later-described flowchart of FIG. 11. Note that the shooting process includes a continuous shooting process, a focus adjustment process in a continuous shooting mode, and determination as to execution of the continuous shooting. After the completion of step S209, the processing is returned to step S201.

A live image display subroutine executed in step S201 of FIG. 2 will be described next with reference to a flowchart of FIG. 3.

First, in step S301, picked-up image data output from the image pickup device 108 at a predetermined cycle is subjected to image processing in the image processing unit 110, thus producing image data suitable for display a live image (hereinafter called live image original data). Then, in step S302, it is determined whether the feature point extraction process is completed. Whether the feature point extraction process is completed can be determined based on the state of the extraction process completion flag. If the extraction process is not completed, the processing advances to step S303. In step S303, the feature point extraction unit 121 starts the process of extracting the feature points representing, e.g., the shape, the position or the size of the object, from among image data by using the live image data produced in step S301.

On the other hand, if it is determined in step S302 that the feature point extraction process is completed, the processing advances to step S304. In step S304, actually displayed image data (hereinafter called "displayed image data") is synthesized from both the feature point information stored in the DRAM 113 and the latest live image original data. On that occasion, if there is no feature point information, the live image original data is given, as it is, as the displayed image data. Because a cycle during which the live image original data is produced is usually shorter than that during which the feature point extraction process executed by the feature point extraction unit 121 is completed, the feature point information used in step S304 is the latest information extracted at that time.

In step S305, the displayed image data produced in step S304 is written into the VRAM 116 to update an image displayed on the operation-aid display unit 117. In step S306, it is determined whether there is a request for stopping the live image. If there is no request for stopping the live image, the processing is returned to step S301 in which the live image is continuously updated at a predetermined cycle. If there is a request for stopping the live image, the processing advances to step S307 in which the feature point extraction process executed by the feature point extraction unit 121 is stopped. The live image display process is then brought to an end.

An AF operation subroutine executed in step S205 of FIG. 2 will be described next with reference to a flowchart of FIG. 4.

First, in step S401, a scan range (scan area) is set. The scan range is decided depending on various macro/non-macro settings so as to not only satisfy the number of scan data required for executing in-focus determination in accordance with a later-described flowchart of FIG. 7, but also to keep a scan time from being uselessly prolonged. Then, in step S402, an AF area is set which is used to calculate a focus evaluation value set in the AF processing unit 105. In this first exemplary embodiment, when a human face is detected by the feature point extraction unit 121 and the feature point information exists in the DRAM 113, the AF area is set within a shot view at a processing size and position which are indicated by the feature point information. If the feature point information does not exist in the DRAM 113, the AF area is set as a central area of the shot view, which occupies 15% in each of the directions of width and height.

In step S403, a scan operation is performed over the scan range set in step S401 in accordance with a later-described flowchart of FIG. 6. Then, in step S404, in-focus determination is executed using scan data, which has been stored in step S403, in accordance with a later-described flowchart of FIG. 7.

If it is confirmed in step S405 that the result of the in-focus determination in step S404 is YES (PASS=○), the processing advances to step S406. If the result of the in-focus determination in step S404 is NO (FAIL=X), the processing advances to step S407. If the processing advances to step S407 upon the result of the in-focus determination being NO, the focus lens 104 is moved to the so-called definite point, i.e., a position corresponding to the preset object distance. Also, if the processing advances to step S406 upon the result of the in-focus determination being YES, the focus lens 104 is moved in the direction of an optical axis to a peak position of the focus evaluation value which has been calculated in step S404.

A scan subroutine executed in step S403 of FIG. 4 will be described next with reference to a flowchart of FIG. 5.

First, in step S601, the focus lens 104 is moved to a scan start position. The scan start position is set to one end of the set scan range. Then, in step S602, it is determined whether the focus lens 104 has reached the scan start position. If the focus lens 104 has reached the scan start position, the processing advances to step S603, and if not so, the processing is returned to step S602.

If the processing advances to step S603 upon the determination that the focus lens 104 has reached the scan start position, calculation of the focus evaluation value is started. In step S604, the focus evaluation value calculated for the AF area set within the shot view and the position of the focus lens 104 are stored in a calculation memory (not shown) which is incorporated in the system control unit 115. In step S605, it is checked whether the lens position is at a scan end position. If the lens position is at the scan end position, the processing advances to step S610, and if not so, the processing advances to step S606.

If the processing advances to step S606 upon the determination that the focus lens is not at the scan end position, it is checked whether the drive mode is in the continuous shooting mode. If the drive mode is in the continuous shooting mode, the processing advances to step S607, and if not so, the processing advances to step S609. If the processing advances to step S607 upon the determination that the drive mode is in the continuous shooting mode, the number of sampled data taken as the focus evaluation value until that time is checked to determine whether the number of sampled data has reached a predetermined value N. If the number N of sampled data has been taken, the processing advances to step S608 in which the feature point extraction process is started. More specifically, a time required to execute the feature point extraction process is calculated in advance and the predetermined value N for the number of sampled data is set so that a time required to take the focus evaluation value within the scan range in the predetermined number N is overlapped with the time required to execute the feature point extraction process. Further, the feature point extraction process is controlled to be started at the timing in sync with the scan.

In step S609, the focus lens 104 is moved to a position where the focus evaluation value is to be taken next. The scan end position is set to the other end of the set scan range. Thereafter, the processing advances to step S604.

In step S604, the focus evaluation value calculated in the position after moving the focus lens 104 through a predetermined distance in step S609 is stored along with the lens position at that time. Then, if it is determined in step S605 that the focus lens 104 has reached the scan end position, the processing advances to step S610 in which the calculation of the focus evaluation value is stopped.

The foregoing is the scan operation executed in the AF process when the switch SW1 is turned on.

The in-focus determination in step S404 of FIG. 4 will be described next with reference to FIGS. 6-9.

Figure 6:
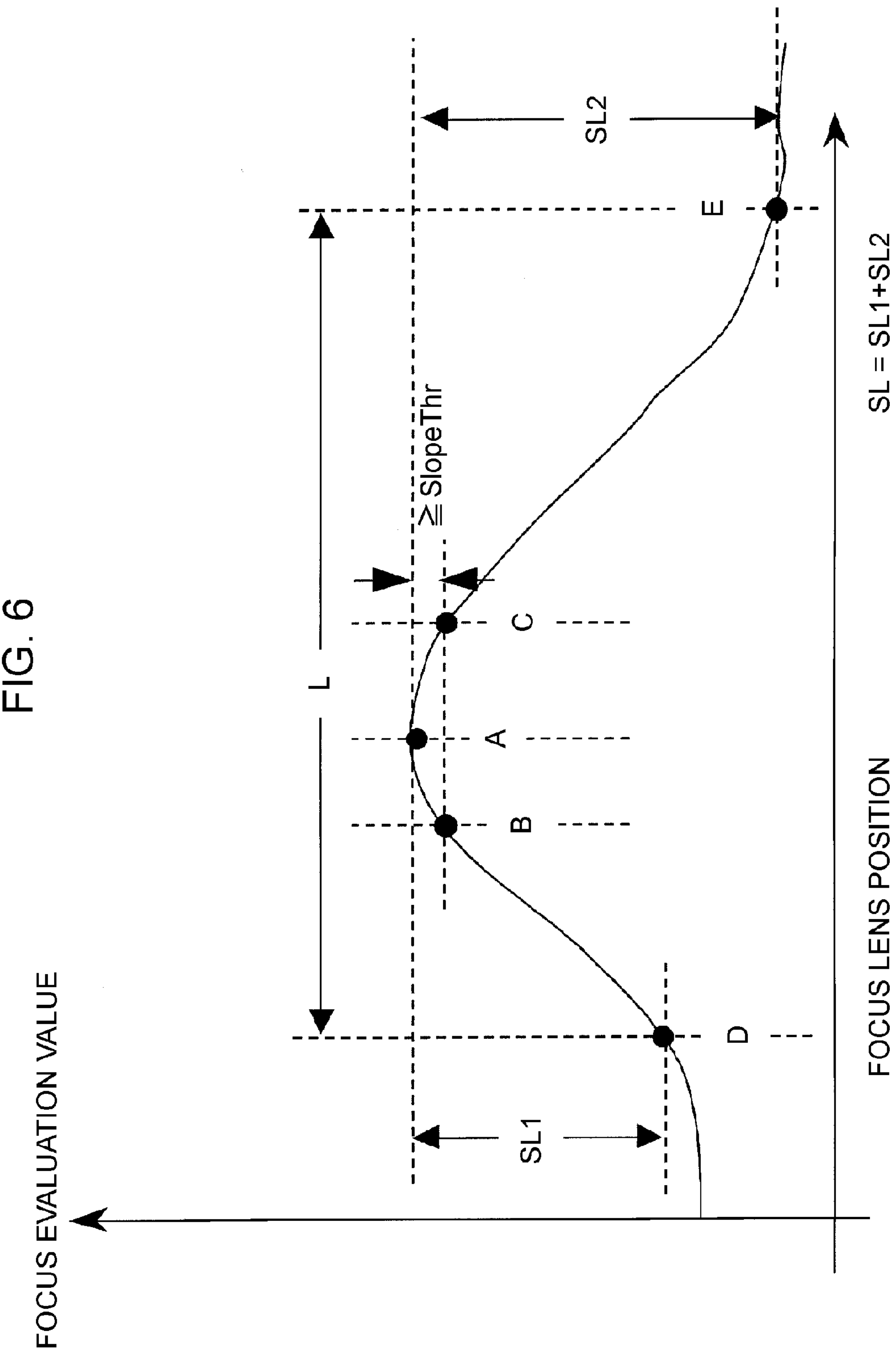
FIG. 6 is a graph illustrating a concept of determining a focus evaluation value in the first and second exemplary embodiments.

Except for a special situation such as the case of far and near objects being in one frame, the focus evaluation value is generally distributed in a mountain-like shape, as shown in FIG. 6, when plotted in a graph with a horizontal axis representing the focus lens position and a vertical axis representing the focus evaluation value. Therefore, the in-focus determination can be performed by determining whether the focus evaluation value is distributed in a mountain-like shape, based on the difference between maximum and minimum ones of the focus evaluation value, the length of a region where a distribution curve is sloped at a gradient of not smaller than a predetermined value (SlopeThr), and the gradient of the sloped region. The determination result of the in-focus determination is provided as an output indicating YES (PASS=○) or NO (FAIL=X) given below;

YES (PASS=○): focus adjustment of the object can be performed based on the peak position of the focus evaluation value, and NO (FAIL=X): contrast of the object is not sufficient, or the object is positioned at a distance outside the scanned range. Herein, as shown in FIG. 6, it is assumed that points until which slopes are continued from the apex (point A) of the mountain-shaped curve are points D and E, the width between the points D and E is a mountain width L, and SL represents the sum (SL1+SL2) of a difference SL1 in the focus evaluation value between the points A and D and a difference SL2 in the focus evaluation value between the points A and E. Also, as shown in FIG. 6, it is assumed that each of points B and C represents a point where the focus evaluation values is reduced by the predetermined value (SlopeThr) from the apex (point A) of the mountain-shaped curve.

Figure 4:
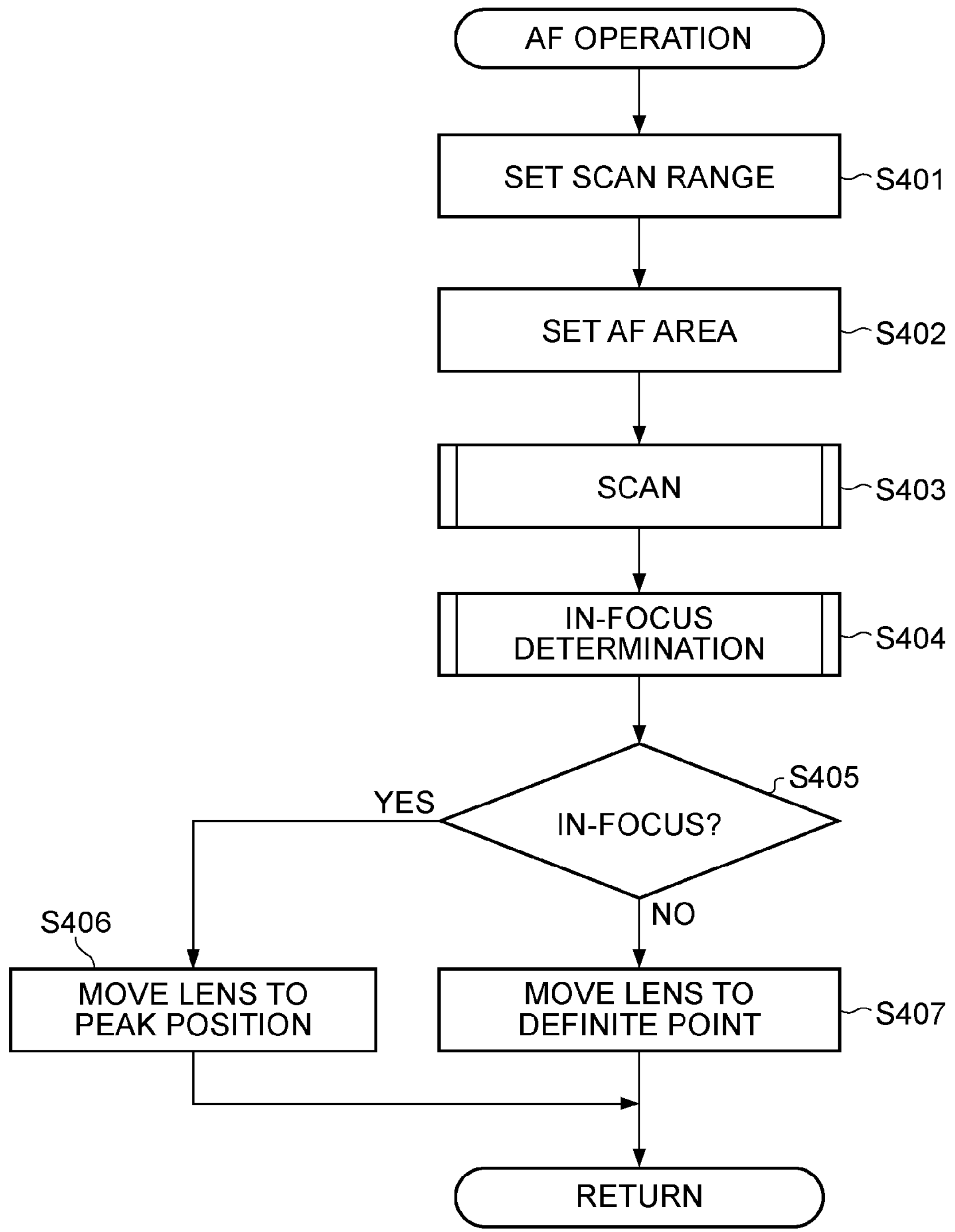
FIG. 4 is a flowchart of an AF operation subroutine in FIG. 2.
Figure 7:
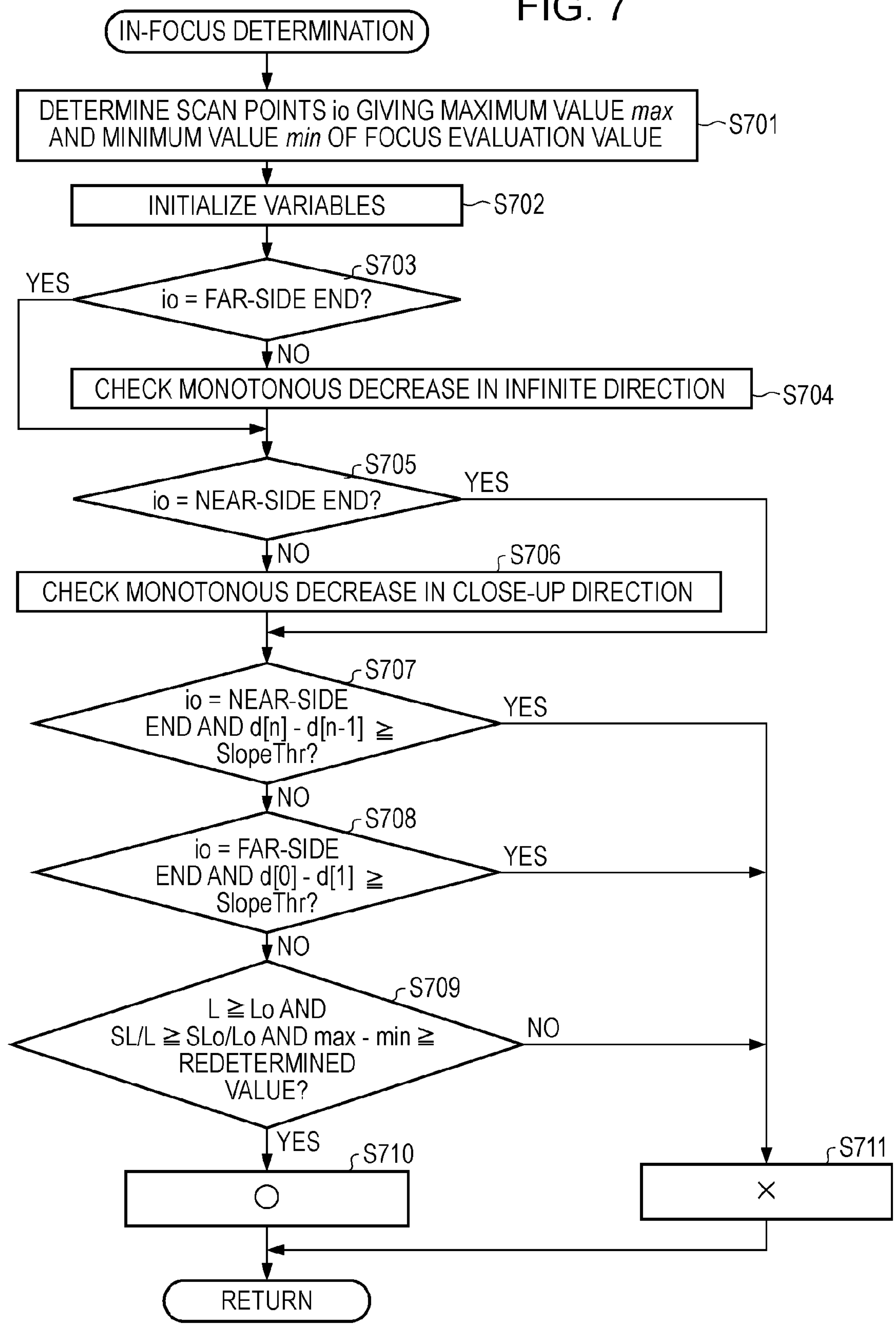
FIG. 7 is a flowchart of an in-focus determination subroutine in FIG. 4.

FIG. 7 is a flowchart showing details of the in-focus determination subroutine in step S404 of FIG. 4.

First, in step S701, scan points $i_0$ giving a maximum value max and a minimum value min of the focus evaluation value are determined. Then, in step S702, the variable L representing the width of the mountain-shaped curve of the focus evaluation value and the variable SL representing the gradient of the mountain-shaped curve are both initialized to 0. In step S703, it is determined whether the scan point $i_0$ giving the maximum value is positioned at a far-side end of the predetermined range over which the scan has been performed. If that scan point $i_0$ is not positioned at the far-side end, the processing advances to step S704 in which a monotonous decrease in the infinite direction is checked. If that scan point $i_0$ is positioned at the far-side end, the processing advances to step S705 by skipping the process of step S704.

Figure 8:
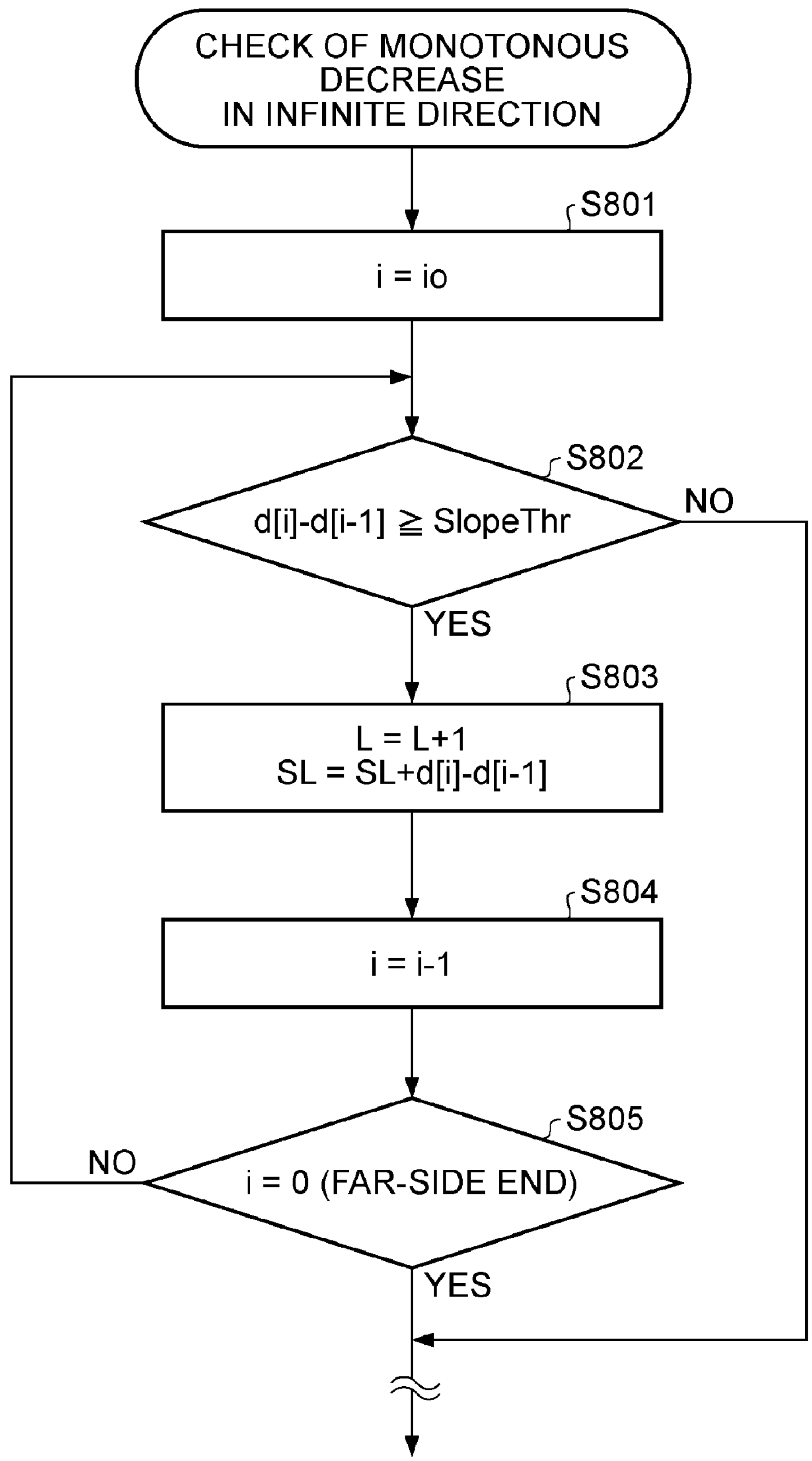
FIG. 8 is a flowchart of an operation of determining a monotonous decrease in an infinite direction in FIG. 7.

A process of checking a monotonous decrease in the infinite direction in step S704 will be described next with reference to a flowchart of FIG. 8.

First, in step S801, a counter variable i is initialized to $i_0$. Then, in step S802, a difference between a focus evaluation value d[i] at a scan point i and a focus evaluation value d[i−1] at a scan point (i−1), which is positioned closer to the infinite side than the scan point i by one scan point, is compared with the predetermined value SlopeThr. If d[i]−d[i−1]≧SlopeThr is held, this is determined as indicating that the monotonous decrease in the infinite direction occurs. Then, the processing advances to step S803. In step S803, the variable L and the variable SL are updated in accordance with the following formula in which L represents the length of the region where the distribution curve of the focus evaluation value is sloped at a gradient of not smaller than the predetermined value (i.e., the mountain width), and SL represents a decrease rate of the mountain-shaped curve in a region in which the focus evaluation value monotonously decreases:

$$L=L+1$$

$$SL=SL+(d[i]-d[i-1])$$

On the other hand, If d[i]−d[i−1]≧SlopeThr is not held, this is determined as indicating that the monotonous decrease in the infinite direction does not occur. Therefore, the process of checking the monotonous decrease in the infinite direction is brought to an end, and the processing advances to step S705.

If the process of checking the monotonous decrease in the infinite direction is continued, the processing advances to step S804. In step S804, i=i−1 is set to shift the point where the focus evaluation value is detected, toward the infinite side by one scan point. In step S805, it is checked whether the counter variable i has reached a value (=0) corresponding to the far-side end position of the predetermined range over which the scan has been performed. If the counter variable i has reached 0, i.e., if the start point for the detection of the monotonous decrease in the infinite direction has reached the far-side end position of the predetermined range over which the scan has been performed, the process of checking the monotonous decrease in the infinite direction is brought to an end, and the processing advances to step S705 of FIG. 7.

In such a manner, the monotonous decrease in the infinite direction from the position corresponding to $i=i_0$ is checked.

Returning to FIG. 7, in step S705, it is determined whether the scan point $i_0$ giving the maximum value is positioned at a near-side end of the predetermined range over which the scan has been performed. If that scan point $i_0$ is not positioned at the near-side end, the processing advances to step S706 in which a monotonous decrease in the close-up direction is checked. If that scan point $i_0$ is positioned at the near-side end, the processing advances to step S707 by skipping the process of step S706.

Figure 9:
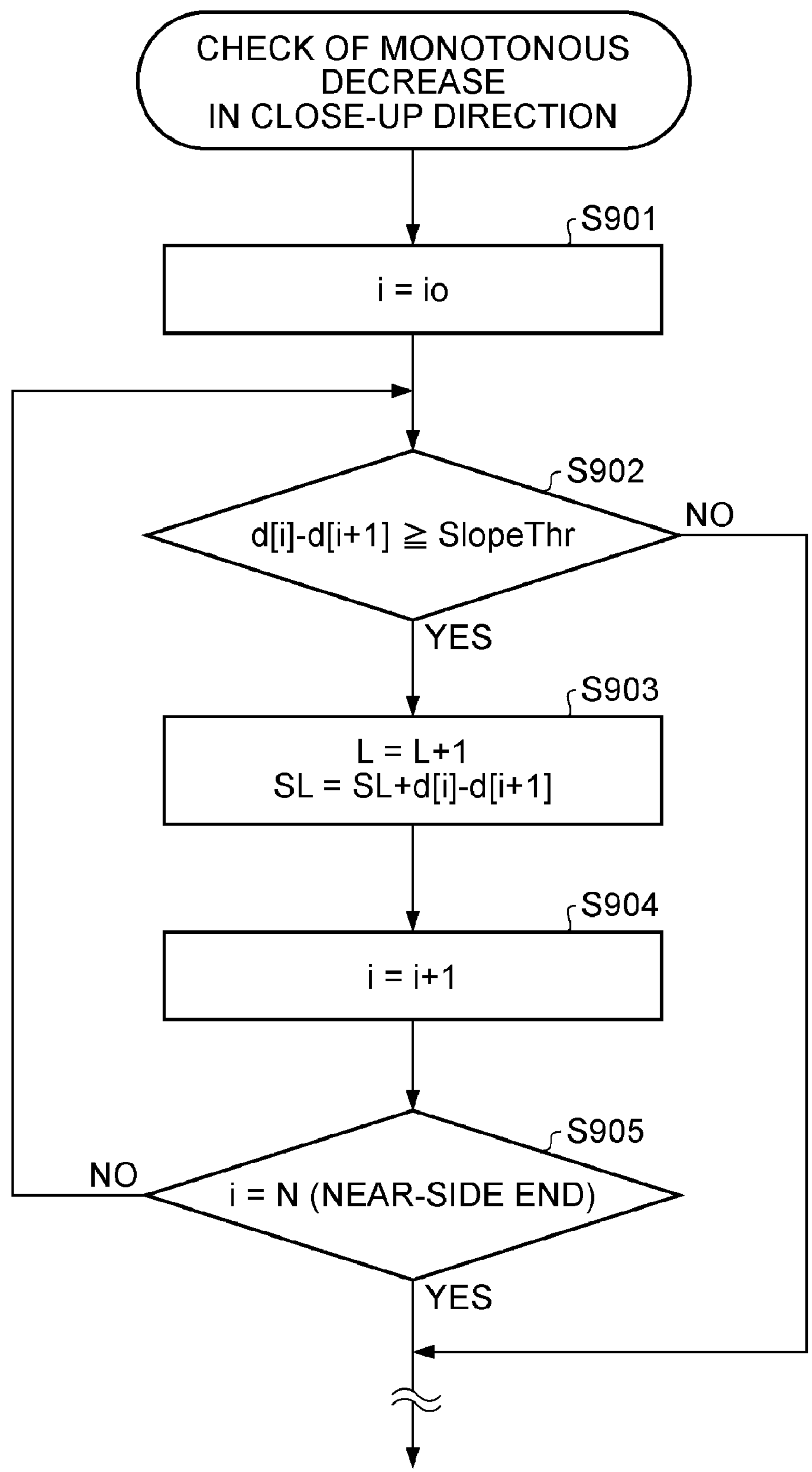
FIG. 9 is a flowchart of an operation of determining a monotonous decrease in a close-up direction in FIG. 7.

A process of checking a monotonous decrease in the close-up direction in step S706 will be described next with reference to a flowchart of FIG. 9.

First, in step S901, the counter variable i is initialized to $i_0$. Then, in step S902, a difference between the focus evaluation value d[i] at the scan point i and a focus evaluation value d[i+1] at a scan point (i+1), which is positioned closer to the close-up side than the scan point i by one scan point, is compared with the predetermined value SlopeThr. If d[i]−d[i+1]≧SlopeThr is held, this is determined as indicating that the monotonous decrease in the close-up direction occurs. Then, the processing advances to step S903. In step S903, the variable L and the variable SL are updated in accordance with the following formula in which L represents the length of the region where the distribution curve of the focus evaluation value is sloped at a gradient of not smaller than the predetermined value (i.e., the mountain width), and SL represents a decrease rate of the mountain-shaped curve in a region in which the focus evaluation value monotonously decreases:

$$L=L+1$$

$$SL=SL+(d[i]-d[i+1])$$

On the other hand, If d[i]−d[i+1]≧SlopeThr is not held, this is determined as indicating that the monotonous decrease in the close-up direction does not occur. Therefore, the process of checking the monotonous decrease in the close-up direction is brought to an end, and the processing advances to step S707.

If the process of checking the monotonous decrease in the close-up direction is continued, the processing advances to step S904. In step S904, i=i+1 is set to shift the point where the focus evaluation value is detected, toward the close-up side by one scan point. In step S905, it is checked whether the counter variable i has reached a value (=N) corresponding to the near-side end position of the predetermined range over which the scan has been performed. If the counter variable i has reached N, i.e., if the start point for the detection of the monotonous decrease in the close-up direction has reached the near-side end position of the predetermined range over which the scan has been performed, the process of checking the monotonous decrease in the close-up direction is brought to an end, and the processing advances to step S707 of FIG. 7.

Thus, the monotonous decrease in the close-up direction from the position corresponding to $i=i_0$ is checked.

If the processes of checking the monotonous decrease in the infinite direction and the close-up direction are completed, whether the focus adjustment of the object can be performed (○) or not (X) is determined by comparing various coefficients with respective thresholds and determining whether the obtained focus evaluation value is distributed in a mountain-shaped curve.

Returning again to FIG. 7, in step S707, it is determined whether the scan point $i_0$ giving the maximum value of the focus evaluation value is positioned at the near-side end of the predetermined range over which the scan has been performed. Further, it is determined whether a difference between a focus evaluation value d[n] at a scan point n corresponding to the near-side end position and a focus evaluation value d[n−1] at a scan point (n−1), which is positioned closer to the infinite side than the scan point n by one scan point, is not smaller than the predetermined value SlopeThr. If both the conditions are satisfied, the processing advances to step S711, and if not so, the processing advances to step S708.

In step S708, it is determined whether the scan point $i_0$ giving the maximum value of the focus evaluation value is positioned at the far-side end of the predetermined range over which the scan has been performed. Further, it is determined whether a difference between a focus evaluation value d[0] at a scan point 0 corresponding to the far-side end position and a focus evaluation value d[1] at a scan point 1, which is positioned closer to the close-up side than the scan point 0 by one scan point, is not smaller than the predetermined value SlopeThr. If both the conditions are satisfied, the processing advances to step S711, and if not so, the processing advances to step S709.

In step S709, it is checked whether the length L of the region where the distribution curve of the focus evaluation value is sloped at a gradient of not smaller than the predetermined value is not smaller than a predetermined value $L_0$. Further, it is checked whether an average value SL/L of the gradient of the sloped region is not smaller than a predetermined value $SL_0/L_0$, and whether a difference between the maximum value max and the minimum value min of the focus evaluation value is not smaller than a predetermined value. If all the conditions are satisfied, the processing advances to step S710, and if not so, the processing advances to step S711.

In step S710, because the obtained distribution curve of the focus evaluation value is in the mountain-like shape and the focus adjustment of the object can be performed, the determination result is given as PASS (○). On the other hand, in step S711, because the obtained distribution curve of the focus evaluation value is not in the mountain-like shape and the focus adjustment of the object cannot be performed, the determination result is given as FAIL (X).

In such a manner, the in-focus determination in step S404 in the flowchart of FIG. 4 is executed.

A shooting process subroutine executed in step S209 of FIG. 2 will be described next with reference to a flowchart of FIG. 10. The shooting process subroutine in this first exemplary embodiment includes decision as to execution of continuous shooting and focus adjustment in the continuous shooting mode.

Figure 10:
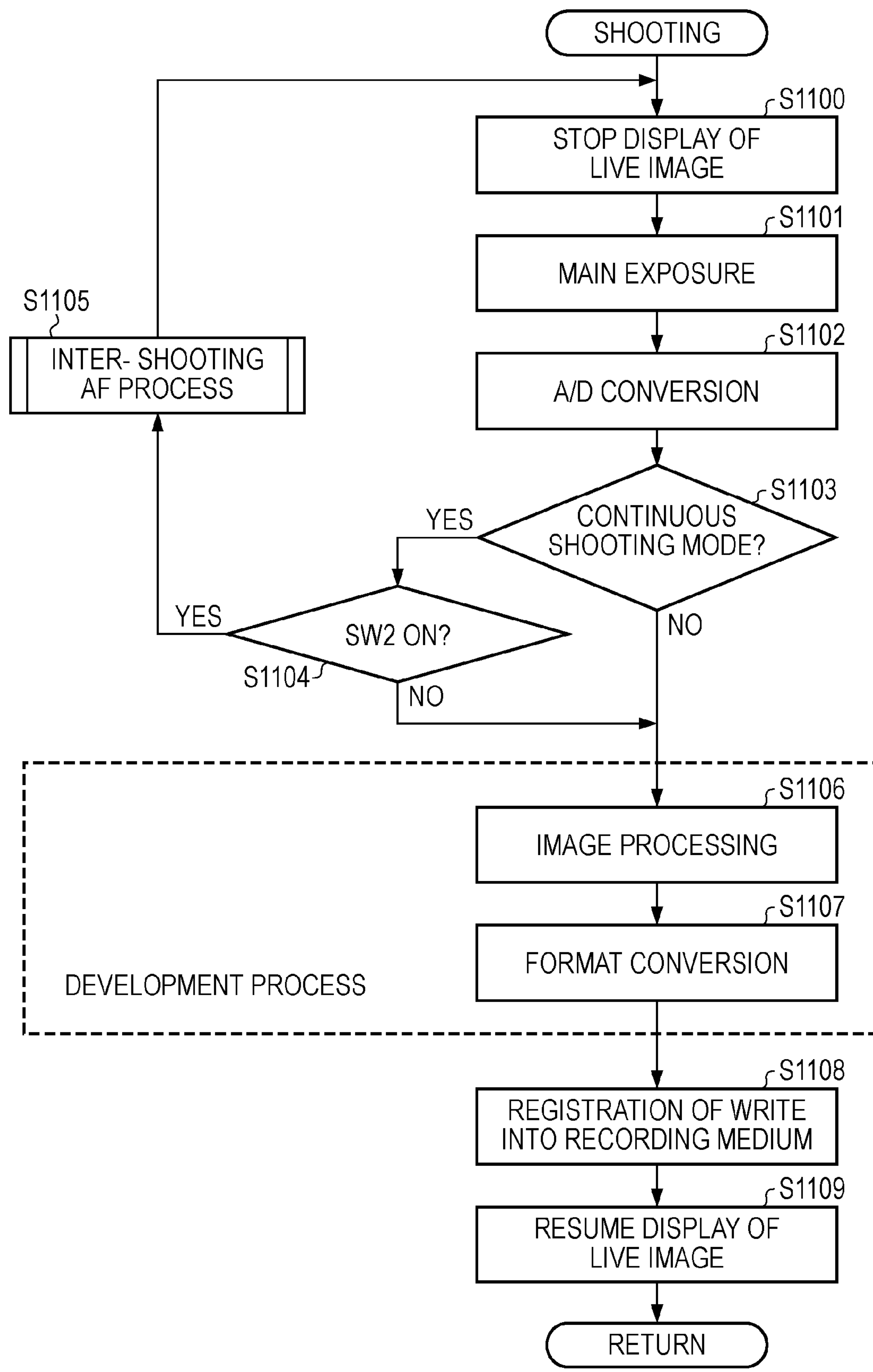
FIG. 10 is a flowchart of a shooting process subroutine in FIG. 2.

First, in step S1100 of FIG. 10, the display of the live image, which has been continued up to that time, is stopped. Then, in step S1101, the image pickup device 108 is subjected to a main exposure. An image focused on the surface of the image pickup device 108 is photoelectrically converted to an analog signal. In step S1102, the analog signal is sent to the A/D converter 109 and is converted to a digital signal after preprocessing such as reduction of noise in an output of the image pickup device 108 and nonlinear processing. In step S1103, it is determined whether the currently set drive mode is the continuous shooting mode. If it is the continuous shooting mode, the processing advances to step S1104, and if it is not the continuous shooting mode, the processing advances to step S1106.

If the processing advances to step S1104 upon the determination that the currently set drive mode is the continuous shooting mode, it is determined whether the switch SW2 is continuously held turned on. If the switch SW2 is continuously held in the turned-on state, the processing advances to step S1105, i.e., a subroutine for the inter-shooting AF process in the continuous shooting mode. The inter-shooting AF process in the continuous shooting mode, executed in step S1105, will be described later with reference to FIGS. 11 and 12. In step S1106, an output signal from the A/D converter 109 is subjected to white balance adjustment in the WB processing unit 111 and is processed into a proper output image signal by the image processing unit 110.

In step S1107, the output image signal is sent to the format converter 112 for image format conversion to the JPEG format, for example. A converted image signal is temporarily loaded (stored) in the DRAM 113 which serves as a working memory. Note that a series of procedures from step S1106 to step S1107 is called a "development process" in this first exemplary embodiment. In step S1108, the following process is executed such that the image recording unit 114 stores data in the DRAM 113, which serves as a working memory, in an internal memory of the camera or an external recording medium, e.g., a memory card, attached to the cameral. A write request is registered to perform a process of writing data in a recording medium, which is executed in parallel to other processes (i.e., delayed write). With that registration of the write request, it is possible to execute, for example, a process of displaying a live image while storing data in the recording medium.

In step S1109, the display of the live image, which has been stopped in step S1100, is resumed. The term "live image" used herein means an image obtained by image-pickup with not intent to write data in a recording medium. Stated another way, an image displayed on the operation-aid display unit 117 without aiming at recording and/or storage provides the live image. With the display of the live image, a user (photographer) can continue the continuous shooting while confirming the field angle and the object under the shooting.

Thus, when the continuous shooting mode is set and the switch SW2 is turned on, the continuous shooting is performed in a successive manner. When either one of the above two conditions is not satisfied, single shooting is performed.

Figure 11:
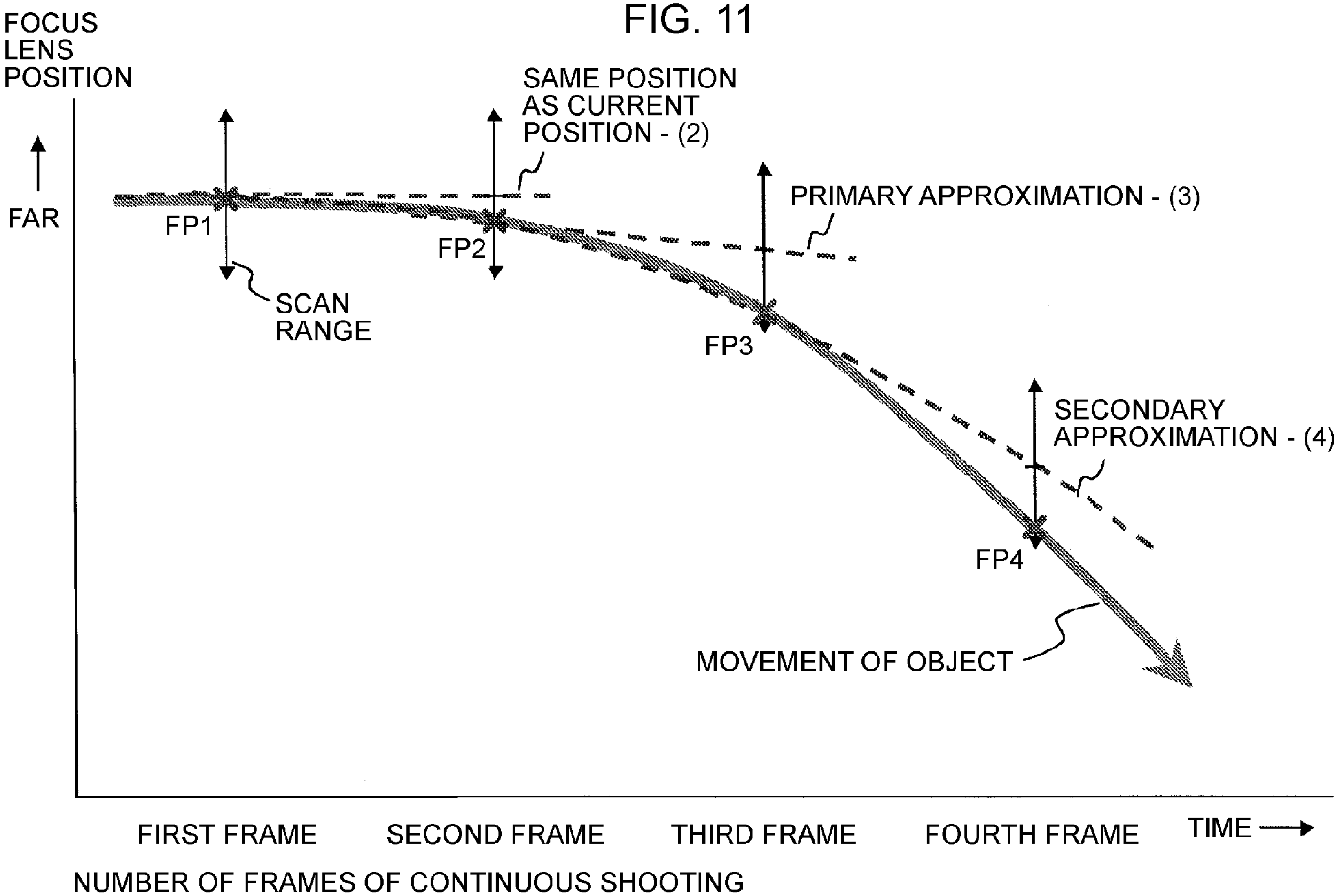
FIG. 11 is a graph illustrating setting of a scan range for an inter-shooting AF process in a continuous shooting mode in the first exemplary embodiment of the present invention.
Figure 12:
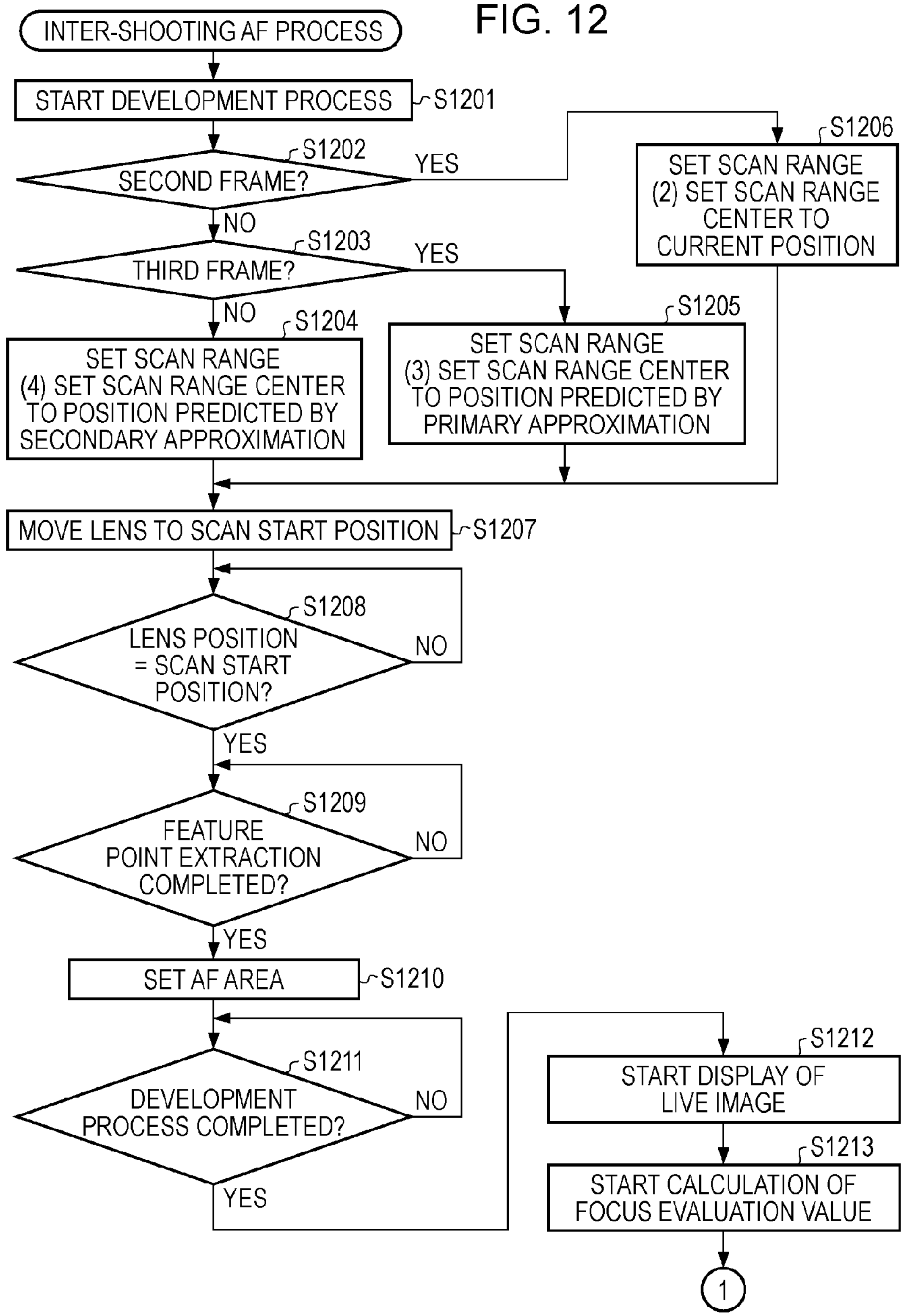
FIG. 12 is a flowchart showing the inter-shooting AF process in the continuous shooting mode in the first exemplary embodiment of the present invention.
Figure 13:
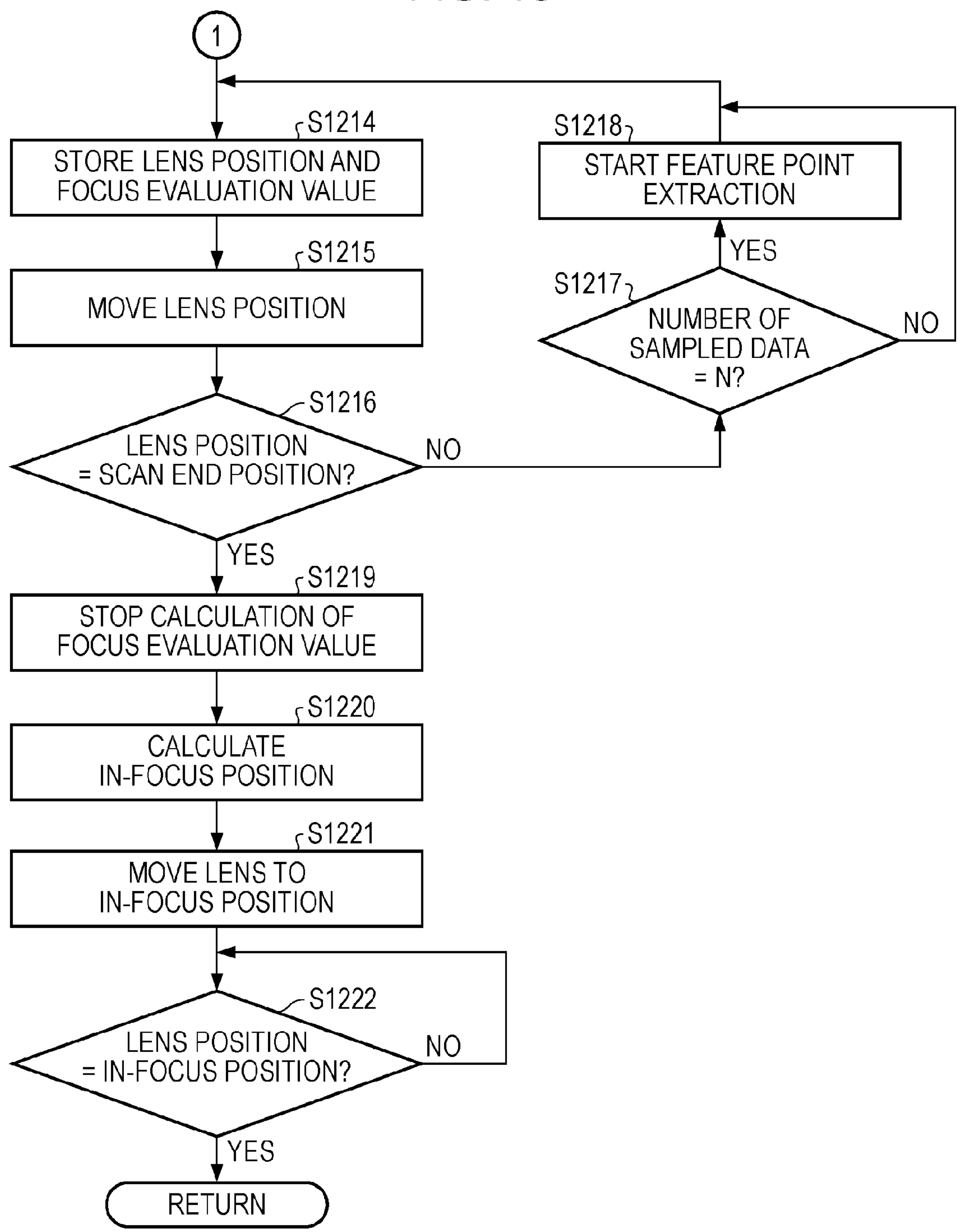
FIG. 13 is a flowchart showing a continued part of the operation in FIG. 12.
Figure 14:
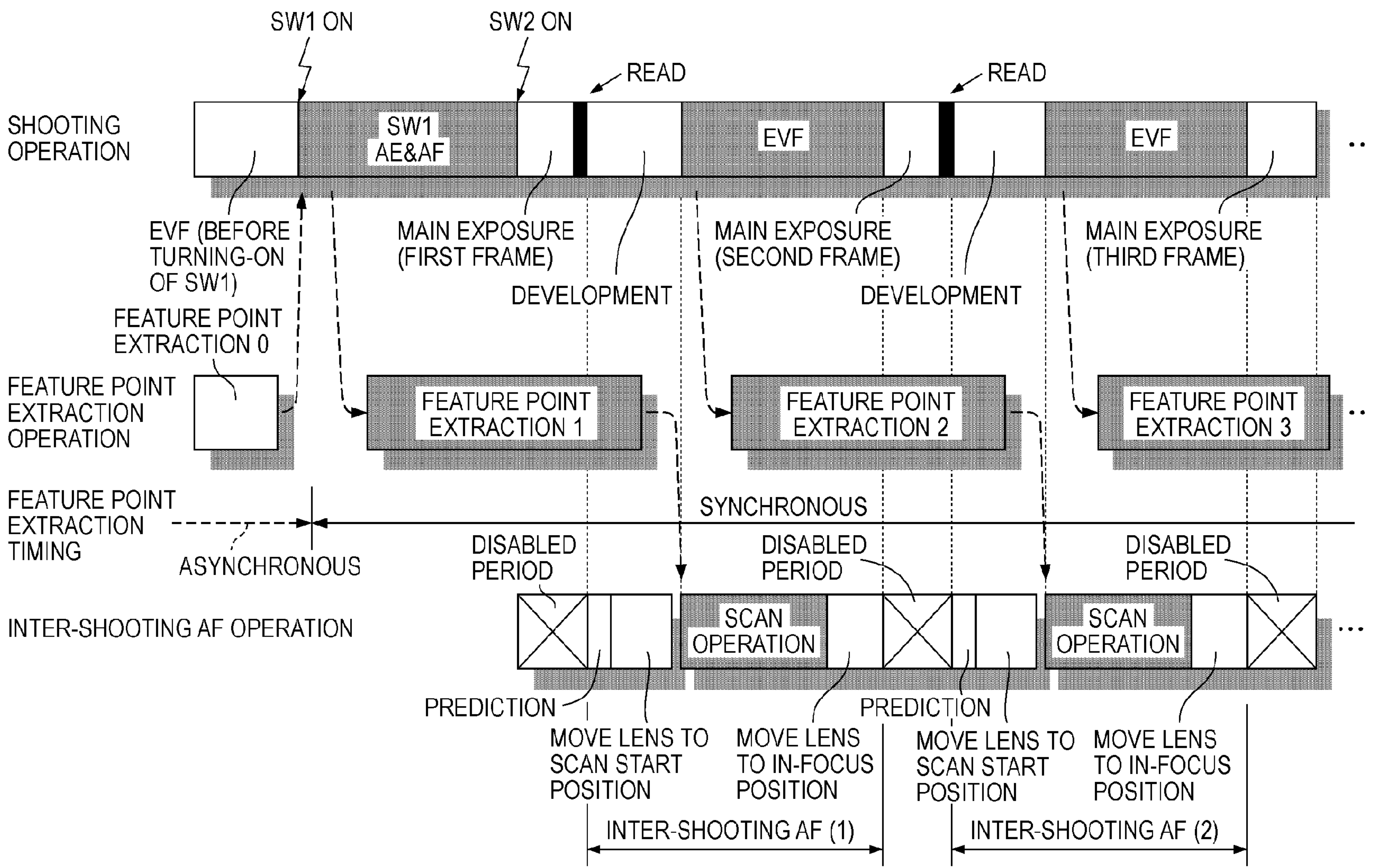
FIG. 14 is a chart showing the timing to execute the inter-shooting AF process in the continuous shooting mode in the first exemplary embodiment of the present invention.

A subroutine for the inter-shooting AF process in the continuous shooting mode, which is executed in step S1105 of FIG. 10, will be described next with reference to FIGS. 11, 12, 13 and 14. FIG. 11 is a graph illustrating setting of the scan range, and FIGS. 12 and 13 are flowcharts showing the inter-shooting AF process in the continuous shooting mode in series. FIG. 14 is a chart showing the timing to execute the inter-shooting AF process in the continuous shooting mode, which is executed in accordance with the flowcharts of FIGS. 12 and 13, in parallel to other processes.

First, in step S1201 of FIG. 12, the development process is started. The start timing of the development process is immediately after the completion of read of a main exposure image signal, shown in FIG. 14. Then, in step S1202, it is checked whether a shot is a second frame of the continuous shooting. If the shot is the second frame of the continuous shooting, the processing advances to step S1206. If the shot is not the second frame of the continuous shooting, the processing advances to step S1203.

If the processing advances to step S1206 upon the determination that the shot is the second frame of the continuous shooting, the current position, i.e., the focus lens position (FP1) for a first frame of the continuous shooting, is set as a center of the scan range (see (2) in FIG. 11). On that occasion, a width of the scan range is set to a predetermined value with priority paid not to prolong an interval time of the successive shootings, while confirming, for example, that the AF operation is completed within the interval time of the successive shootings. In the first frame of the continuous shooting (i.e., when shooting the first frame), the scan range is set to an entire range in which the AF operation can be executed in the set mode.

If the processing advances to step S1203 upon the determination that the shot is not the second frame of the continuous shooting, it is checked whether the shot is a third frame of the continuous shooting. If the shot is the third frame of the continuous shooting, the processing advances to step S1205. If the shot is not the third frame of the continuous shooting, the processing advances to step S1204. In step S1205, because two kinds of in-focus position information for the first and second frames of the continuous shooting exist as in-focus position history information, object estimation is performed based on primary approximation by assuming the interval time of the successive shootings to be constant, thus obtaining a scan center position ObjP3 from the following formula (1) (see (3) in FIG. 11):

$$ObjP3=FP2+(FP2-FP1)\times FpAdj3 \quad (1)$$

FP1: focus lens position for the first frame of the continuous shooting

FP2: focus lens position for the second frame of the continuous shooting

FpAdj3: parameter ranging from 0 (preceding position) to 1 (predicted position)

In addition, the parameter FpAdj(n) serves as a parameter for weight setting of both the object prediction result and the just-preceding in-focus position, and it takes a value ranging from 0 to 1. The focus lens position in FIG. 11 is plotted on the assumption of FpAdj(n)=1. The scan range width is set as a constant scan range width as in step S1206.

If the processing advances to step S1204 upon the determination that the shot is not the third frame of the continuous shooting, because of three kinds of just-preceding in-focus position information existing as in-focus position history information, object estimation is performed based on secondary approximation by assuming the interval time of the successive shootings to be constant, thus obtaining a scan center position ObjP4 from the following formula (2) (see (4) in FIG. 11):

$$ObjP4=(FP1-3\cdot FP2+3\cdot FP1)\times FpAdj4+FP3\times(1-FpAdj4)=(FP1-3\cdot FP2+2\cdot FP3)\times FpAdj4+FP3 \quad (2)$$

FP3: focus lens position for the third frame of the continuous shooting

Similarly, for an n-th frame of the continuous shooting, a scan center position ObjP(n) is obtained based on the secondary approximation by using the following formula (3):

$$ObjP(n)=\{(FP(n-3)-3\cdot FP(n-2)+2\cdot FP(n-1)\}\times FpAdj(n)+FP(n-1) \quad (3)$$

The scan range width is set as a constant scan range width as in step S1206.

Then, the processing advances to step S1207 in which the focus lens 104 is moved to a scan start position of the scan range which has been set in one of step S1204 to S1206. As shown in FIG. 14, therefore, the development process can be executed in parallel while moving the focus lens 104 to the scan start position.

In step S1208, it is determined whether the focus lens 104 has reached the scan start position. If the focus lens 104 has reached the scan start position, the processing advances to step S1209. If the focus lens 104 has not yet reached the scan start position, the processing is returned to step S1208 to wait for until the lens movement to the scan start position is completed.

In step S1209, it is determined whether the feature point extraction unit 121 has completed the feature point extraction process. In the case of an inter-shooting AF(1) operation in the continuous shooting mode shown in FIG. 14, for example, the feature point extraction process of which completion is waited herein is one that has been started for the AF operation in step S608 of FIG. 5 upon the turning-on of the switch SW1. Also, when the continuous shooting is continued, the feature point extraction process of which completion is waited herein is one that has been started in step S1218 (later described) for the inter-shooting AF operation in the continuous shooting mode. If the feature point extraction unit 121 has completed the feature point extraction process, the processing advances to step S1210. If not completed, the processing is returned to step S1209 to wait for the completion of the feature point extraction process. In step S1210, the AF area is set in a similar manner to that in step S402 of FIG. 4. Herein, as shown in FIG. 6, it is assumed that FP4 is the focus lens position for the fourth frame of the continuous shooting.

In step S1211, it is confirmed whether the development process is completed. If the development process is not yet completed, the processing is returned to step S1211 to wait for the completion of the development process. If the development process is completed, a next process in step S1212 is executed. Accordingly, unless the lens movement to the scan start position, the setting of the AF area, and the development process are all completed, the processing does not advance to the next step. In step S1212, the display of the live image is started. Further, in step S1213, the calculation of the focus evaluation value is resumed. The resumed display of the live image is one that has been stopped immediately before the main exposure executed in step S1100 of FIG. 10. The term “main exposure” means an exposure of an image which is recorded as a still picture. During a period covering the main exposure and the development process of image data obtained with the main exposure, the live image cannot be produced and therefore the display of the live image is stopped.

In step S1214, the focus evaluation value obtained for the AF area set within the shot view and the position of the focus lens 104 are stored in the calculation memory (not shown) which is incorporated in the system control unit 115. In step S1215, the focus lens 104 is driven to move in a predetermined direction through a predetermined amount. In step S1216, it is checked whether the position of the focus lens 104 is at a scan end position. If the position of the focus lens 104 is at the scan end position, the processing advances to step S1219, and if not so, the processing advances to step S1217.

In step S1217, the number of data of the focus evaluation value having been sampled up to that time is checked to determine whether the number of sampled data has reached a predetermined value N. If the number N of data has been sampled, the processing advances to step S1218 in which the feature point extraction process is started. Stated another way, the timing to start the feature point extraction process is controlled by calculating the time required for the feature point extraction process in advance, and setting the predetermined value N so that the time required to execute the feature point extraction process is overlapped with the time required to obtain the focus evaluation value within the scan range.

After the focus lens 104 has reached the scan end position, the calculation of the focus evaluation value is stopped in step S1219. If the processing advances to step S1220, the in-focus position is decided by calculating the peak position of the focus evaluation value from the focus evaluation value and the lens position which have been stored in step S1214. In step S1221, the focus lens 104 is moved to the in-focus position decided in step S1220. In step S1222, it is determined whether the position of the focus lens 104 has reached the in-focus position. If the focus lens 104 has not yet reached the in-focus position, the processing is returned to step S1222 to wait for until the focus lens 104 reaches the in-focus position. If the focus lens 104 has reached the in-focus position, the inter-shooting AF(1) process in the continuous shooting mode is brought to an end.

The foregoing control flow will now be described from another aspect, i.e., primarily from the viewpoint of the timing to execute various processes, with reference to FIG. 14.

If the conditions for the continuation of the continuous shooting are satisfied prior to start of the inter-shooting AF(1) operation in the continuous shooting mode shown in FIG. 14, the feature point extraction process (feature point extraction 1 in FIG. 14) is executed based on the live image used in the scan operation for the preceding AF operation (herein, the AF operation immediately after the turning-on of the switch SW1). Because the feature point extraction process is a time-consuming process, the feature point extraction 1 is executed in parallel to a series of processes including not only the scan operation for the preceding AF operation, but also the development process executed after the main exposure of the first frame. At the same time, the prediction of the object and the movement of the focus lens 104 to the scan start position are also executed.

When the feature point extraction process is completed, the extraction result is reflected on setting of the AF area when the focus evaluation value is calculated during the scanning for the inter-shooting AF(1) operation in the continuous shooting mode. The calculation of the focus evaluation value is then executed for the position of a human face extracted from the view covered by the field angle of the shot. Also, when the continuous shooting is continued, the feature point extraction process (herein, feature point extraction 2 in FIG. 14) is executed based on the live image used during the scanning for the preceding inter-shooting AF(1) operation in the continuous shooting mode, as indicated by an inter-shooting AF(2) operation in the continuous shooting mode in FIG. 14. The extraction result is reflected on the scanning in the succeeding scan operation.

According to the first exemplary embodiment described above, as seen from FIG. 14, various processes constituting the feature point extraction operation and the focus adjustment operation of the contrast detection type can be executed in parallel to a series of continuous shooting operations at the synchronized timing. The various processes include the scan operation and the calculation of the in-focus position which are executed in the preceding in-focus position detection process, as well as the decision of the scan range and the lens movement to the scan start position which are executed in the current in-focus position detection process.

Hence, the result of the feature point extraction process can be efficiently reflected on the focus adjustment operation of the contrast detection type within a limited time between successive shootings in the continuous shooting mode.

More specifically, in a situation of less restriction on time, such as when the single shooting mode is set, the feature point extraction operation for obtaining information as to detection of the object displayed in the live image is executed at a cycle optimum for the display in consideration of power consumption, a better appearance of the live image, etc. Further, the feature point extraction operation and the focus adjustment operation are executed in an asynchronous relation by setting, in the focus adjustment operation, the AF area based on the information that has been extracted in the last feature point extraction operation.

On the other hand, when the drive mode is set to a mode imposing severer restriction on time, such as the continuous shooting mode, the feature point extraction operation and the focus adjustment operation are executed in a synchronous relation so that the result of the feature point extraction operation can be reflected on the focus adjustment operation at the proper timing within a limited time. Thus, the feature point extraction operation and the focus adjustment operation can be executed in a manner suitable for the property of the currently set mode.

In the first exemplary embodiment, the term "development process" is used as indicating the process from reading of the output signal from the A/D converter 109 to the conversion of the read signal to the appropriate format, e.g., JPEG. However, the system configuration can also be changed as follows. In one example of modifications, the output signal from the A/D converter 109 is subjected to the white balance adjustment in the WB processing unit 111. Then, a proper output image signal is produced by the image processing unit 110. In this case, the process until the production of the proper output image signal is defined as the "development process". Production and display of the live image are started immediately after the development process, i.e., from a point in time at which the system comes into a state capable of producing the live image. With such a modification, the format conversion of the output image signal to, e.g., JPEG and the display of the live image can be executed in parallel.

Second Exemplary Embodiment

A second exemplary embodiment of the present invention will be described below with reference to the drawings. The second exemplary embodiment is described in connection with the inter-shooting focus adjustment operation executed in a system in which the time required for the feature point extraction unit 121 to detect a human face is completed within the time required for the development process.

Figure 16:
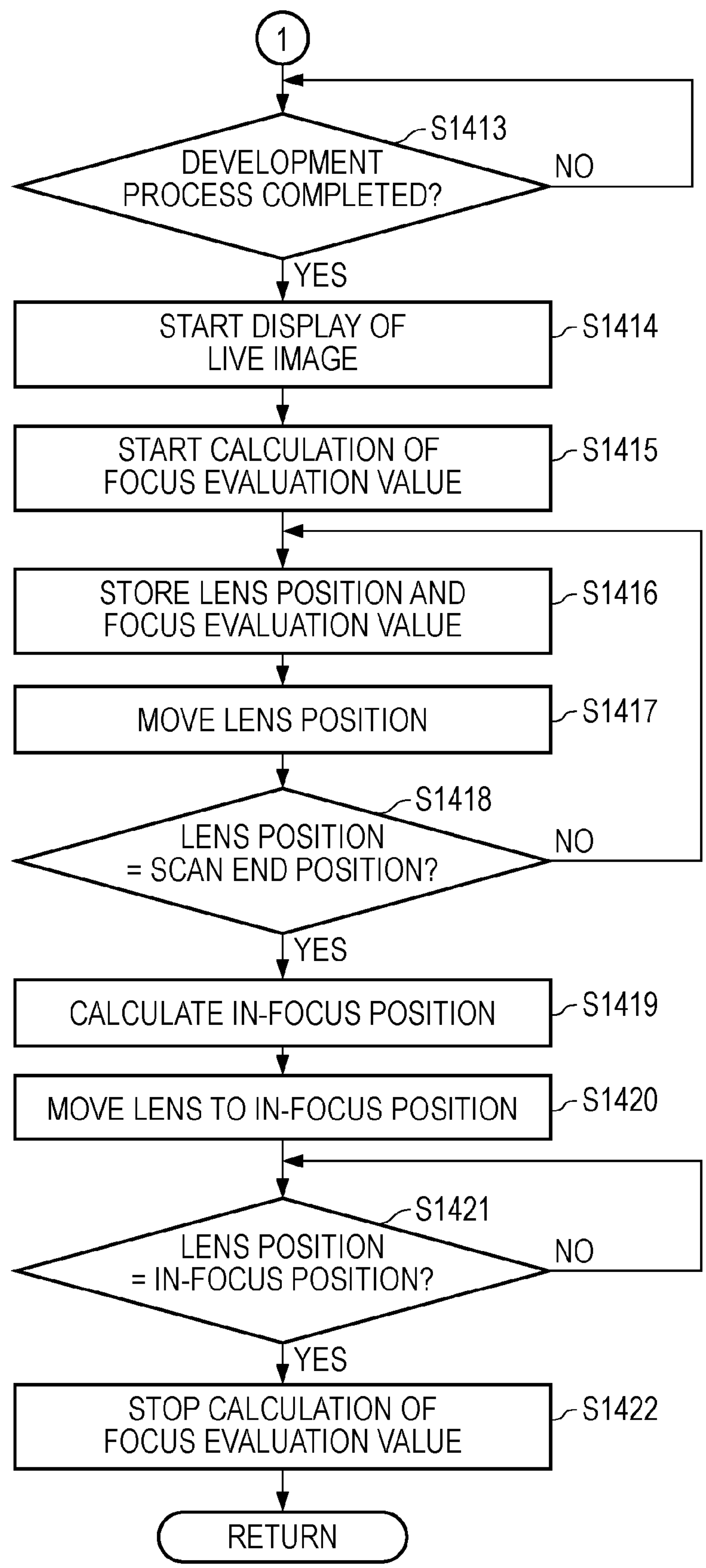
FIG. 16 is a flowchart showing a continued part of the operation in FIG. 15.
Figure 17:
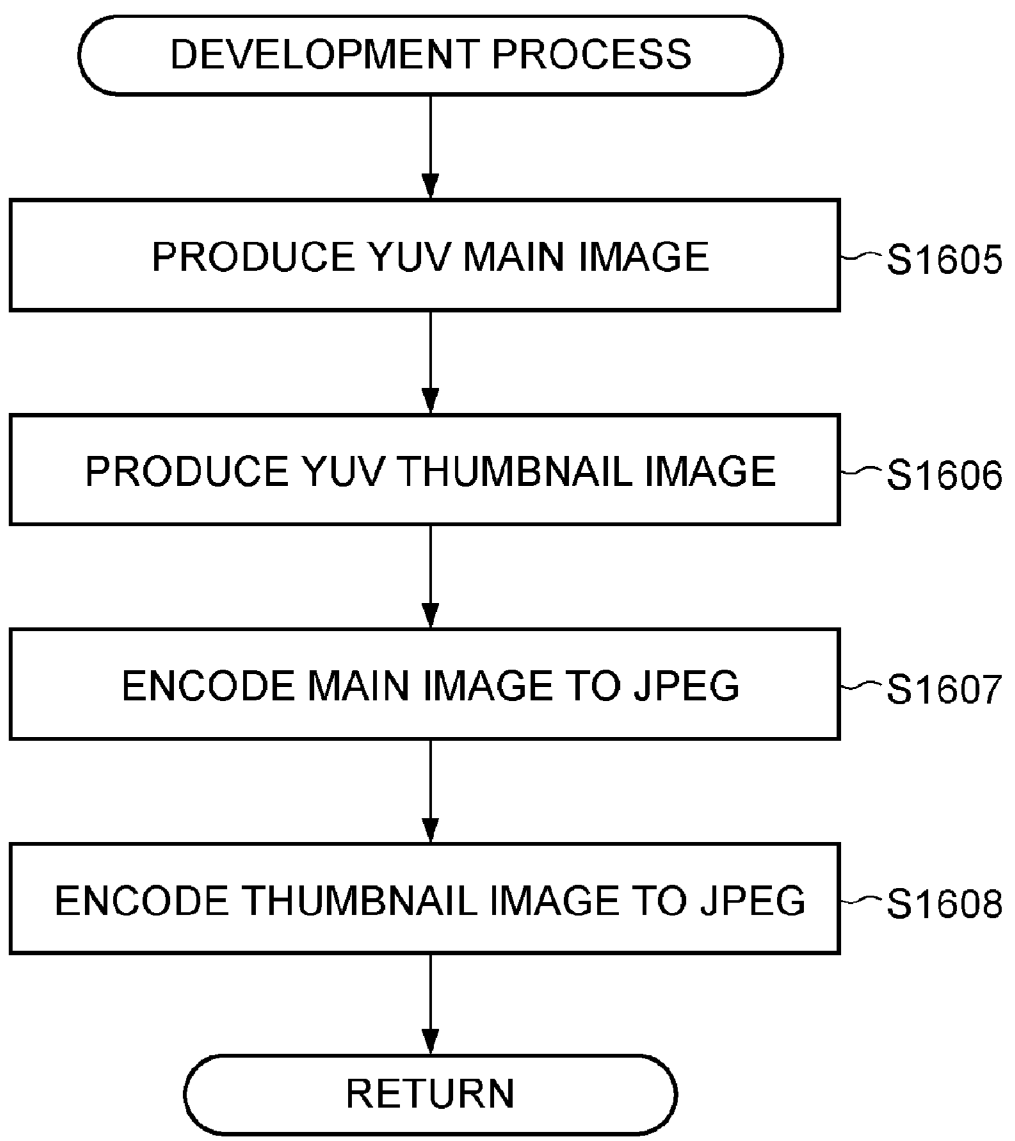
FIG. 17 is a flowchart showing a development process according to the second exemplary embodiment of the present invention.

A circuit configuration of an image pickup apparatus according to the second exemplary embodiment is similar to that shown in FIG. 1. The basic operation shown in FIGS. 2-4 and the shooting operation shown in FIG. 10, described above in connection with the first exemplary embodiment, are also similarly applied to the second exemplary embodiment. Therefore, a detailed description of those operations is not repeated here. Moreover, the scan operation in step S403 of FIG. 4 is common to the first and second exemplary embodiments except for that the processing in steps S606-S608 of FIG. 5 is not executed in the second exemplary embodiment. Thus, the following description is given of the inter-shooting focus adjustment operation in the continuous shooting mode, which differs in the second exemplary embodiment, with reference to FIGS. 15-18. A series of processes shown in flowcharts of FIGS. 15-17 are executed by the system control unit 115.

First, the development process is started in step S1401 of FIG. 15. The development process is started immediately after the completion of read of a main-exposure image signal shown in FIG. 18, and it is executed in parallel to the inter-shooting AF(1) process.

Details of step S1401 to execute the development process in the second exemplary embodiment will be described next with reference to FIG. 17.

First, in step S1605, data of a main image in the YUV format is produced from the image data read out of the image pickup device. Then, in step S1606, data of a thumbnail image in the YUV format is produced and stored together with the main image data. In step S1607, the main image in the YUV format produced in step S1605 is encoded to the JPEG format. Similarly, in step S1608, the thumbnail image in the YUV format is encoded to the JPEG format. Through a series of the processes described above, data read out from the image pickup device is converted to data in the JPEG format to be recorded.

Returning to the flowchart of FIG. 15, in step S1402, it is checked whether a shot is a second frame of the continuous shooting. If the shot is the second frame of the continuous shooting, the processing advances to step S1406. If the shot is not the second frame of the continuous shooting, the processing advances to step S1403. A method of deciding the scan range with the prediction process depending on the number of frames of the continuous shooting, which is shown in steps S1404, S1405 and S1406, is similar to that described above in the first exemplary embodiment with reference to FIG. 12. Hence, a description of the method of deciding the scan range is not repeated here.

If the processing advances to step S1407, the focus lens 104 is started to be moved to the scan start position of the scan range which has been set in one of step S1404 to step S1406. In step S1408, the system control unit waits for the completion of a process of producing the thumbnail image in the YUV format, which is executed as a part of the development process. If the thumbnail image in the YUV format is already produced in step S1606 of FIG. 17, the processing advances to step S1409, and if the thumbnail image is not yet produced, the processing is returned again to step S1408.

Figure 18:
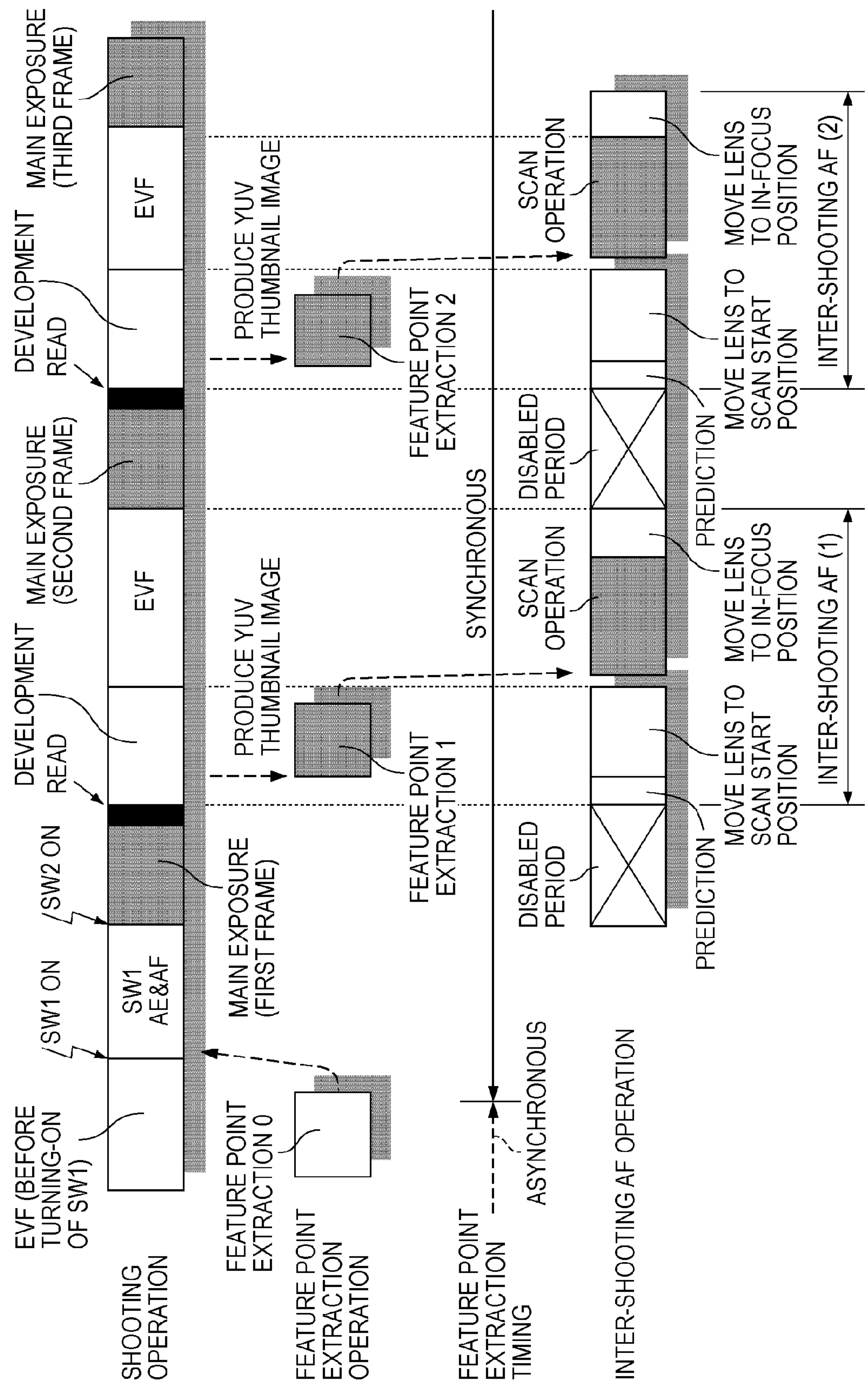
FIG. 18 is a chart showing the timing to execute the inter-shooting AF process in the continuous shooting mode in the second exemplary embodiment of the present invention.

In step S1409, the feature point extraction unit 121 starts the feature point extraction process by using, as an input value, the produced thumbnail image in the YUV format. Accordingly, as shown in FIG. 18, the feature point extraction process and a remaining part of the development process are executed in parallel during the movement of the focus lens 104. In step S1410, it is determined whether the focus lens 104 has reached the scan start position. If the focus lens 104 has not yet reached the scan start position, the processing is returned to step S1410 to wait for until the lens movement to the scan start position is completed.

On the other hand, if the focus lens 104 has reached the scan start position, the processing advances to step S1411 in which it is determined whether the feature point extraction unit 121 has completed the feature point extraction process. If the feature point extraction unit 121 has completed the feature point extraction process, the processing advances to step S1412. If not so, the processing is returned to step S1411 to wait for until the feature point extraction process is completed. In step S1412, the AF area is set as in step S402 of FIG. 4. Then, it is confirmed in step S1413 of FIG. 16 whether the development process is completed. If the development process is not yet completed, the processing is returned to step S1413 to wait for the completion of the development process. If the development process is completed, a next process in step S1414 is executed. Accordingly, unless the lens movement to the scan start position, the setting of the AF area, and the development process are all completed, the processing does not advance to the next step.

In step S1414, the display of the live image is started. Further, in step S1415, the calculation of the focus evaluation value is resumed. The resumed display of the live image is one that has been stopped immediately before the main exposure executed in step S1100 of FIG. 10. The term "main exposure" means an exposure of an image which is recorded as a still picture. During a period covering the main exposure and the development process of image data obtained with the main exposure, the live image cannot be produced and therefore the display of the live image is stopped.

In step S1416, the focus evaluation value obtained for the AF area set within the shot view and the position of the focus lens 104 are stored in the calculation memory (not shown) which is incorporated in the system control unit 115. In step S1417, the focus lens 104 is driven to move in a predetermined direction through a predetermined amount. In step S1418, it is checked whether the position of the focus lens 104 is at a scan end position. If the position of the focus lens 104 is at the scan end position, the processing advances to step S1419, and if not so, the processing is returned to step S1416 to continue the scan operation.

If the processing advances to step S1419, the in-focus position is decided by calculating the peak position of the focus evaluation value from the focus evaluation value and the lens position which have been stored in step S1416. In step S1420, the focus lens 104 is moved to the in-focus position decided in step S1419. In step S1421, it is determined whether the position of the focus lens 104 has reached the in-focus position. If the focus lens 104 has reached the in-focus position, the processing advances to step S1422. If the focus lens 104 has not yet reached the in-focus position, the processing is returned to step S1421 to wait for until the focus lens 104 reaches the in-focus position. Then, in step S1422, the calculation of the focus evaluation value is stopped.

The foregoing control flow will now be described from another aspect, i.e., primarily from the viewpoint of the timing to execute various processes, with reference to FIG. 18.

In an inter-shooting AF(1) operation in the continuous shooting mode shown in FIG. 18, the feature point extraction process (feature point extraction 1 in FIG. 18) is started in match with the production of the thumbnail image in the YUV format, which is performed during the development process of the image data obtained in the preceding main exposure (for a first frame). Thus, the feature point extraction process is executed in parallel to the other process, i.e., the development process. At the same time, the prediction of the object and the movement of the focus lens 104 to the scan start position are also executed. When the development process, the feature point extraction process, and the lens movement to the scan start position are all completed, the result of the feature point extraction process is reflected on setting of the AF area when the focus evaluation value is calculated during the scanning for the inter-shooting AF(1) operation in the continuous shooting mode. The calculation of the focus evaluation value is then executed for the position of a human face extracted from the view covered by the field angle of the shot. Also, when the continuous shooting is continued, the feature point extraction process (herein, feature point extraction 2 in FIG. 18) is executed based on the image data obtained in the preceding main exposure (for a second frame), as indicated by an inter-shooting AF(2) operation in the continuous shooting mode in FIG. 18. The extraction result is reflected on the scanning in the succeeding scan operation.

According to the second exemplary embodiment described above, as seen from FIG. 18, various processes constituting the feature point extraction operation and the focus adjustment operation of the contrast detection type can be executed in parallel to a series of continuous shooting operations at the synchronized timing. The various processes include the decision of the scan range and the lens movement to the scan start position.

Hence, the result of the feature point extraction process can be efficiently reflected on the focus adjustment operation of the contrast detection type within a limited time between successive shootings in the continuous shooting mode.

According to the first and second exemplary embodiments described above, the feature point extraction process can be executed in parallel and the result of the feature point extraction process can be reflected on the succeeding process while realizing the focus adjustment operation of the contrast detection type between successive shootings in the continuous shooting mode. Therefore, a good image precisely focused on a human face can be obtained even in the continuous shooting mode in which shots are continuously taken with an interval between the successive shootings held at a satisfactory value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-338232 filed Dec. 15, 2006, which is hereby incorporated by reference herein in its entirety.

What is claimed is:

1. An apparatus comprising:

an extraction unit configured to extract feature points of an object from picked-up image data;

an adjustment unit configured to calculate a focus evaluation value from image data corresponding to a focus detection area determined based on the feature points while moving a focus lens to a plurality of positions each existing in a direction of an optical axis, detect, from the calculated focus evaluation value, an in-focus position for the focus lens at which the focus lens is in an in-focus state, and move the focus lens to the detected in-focus position; and a setting unit configured to set a shooting mode from among a plurality of shooting modes, the plurality of shooting mode including a continuous shooting mode in which an extraction of feature points and a pickup of an image for storage are repeated plural times and a single shooting mode in which a pickup of an image is not repeated, wherein the feature points include characteristics, such as shape, position, or size, of the object, and wherein the extraction unit extracts, in the continuous shooting mode, the feature points in synchronization with the calculation of the focus evaluation value by the adjustment unit and extracts, in the single shooting mode, the feature points at a predetermined period regardless of the calculation of the focus evaluation value by the adjustment unit.

2. The apparatus according to claim 1, wherein, in the continuous shooting mode, the extraction of the feature points by the extraction unit is performed in parallel to the calculation of the focus evaluation value by the adjustment unit and the extracted feature points are used to determine the focus detection area for the next calculation of the focus evaluation value by the adjustment unit.

3. A method comprising:

extracting feature points of an object from picked-up image data;

calculating a focus evaluation value from image data corresponding to a focus detection area determined based on the feature points while moving a focus lens to a plurality of positions each existing in a direction of an optical axis, detecting, from the calculated focus evaluation value, an in-focus position for the focus lens at which the focus lens is in an in-focus state, and moving the focus lens to the detected in-focus position; and setting a shooting mode from among a plurality of shooting modes, the plurality of shooting mode including a continuous shooting mode in which an extraction of feature points and a pickup of an image for storage are repeated plural times and a single shooting mode in which a pickup of an image is not repeated, wherein the feature points include characteristics, such as shape, position, or size, of the object, and wherein the extracting extracts, in the continuous shooting mode, the feature points in synchronization with the calculation of the focus evaluation value and extracts, in the single shooting mode, the feature points at a predetermined period regardless of the calculation of the focus evaluation value.

4. The method according to claim 3, wherein, in the continuous shooting mode, the extraction of the feature points is performed in parallel to the calculation of the focus evaluation value and the extracted feature points are used to determine the focus detection area for the next calculation of the focus evaluation value.

* * * * *